US010112855B2

(12) United States Patent
Malone

(10) Patent No.: US 10,112,855 B2
(45) Date of Patent: *Oct. 30, 2018

(54) BIOFILTRATION WITH ENHANCED SLUDGE HANDLING

(71) Applicant: Ronald F. Malone, Baton Rouge, LA (US)

(72) Inventor: Ronald F. Malone, Baton Rouge, LA (US)

( * ) Notice: Subject to any disclaimer, the term of this patent is extended or adjusted under 35 U.S.C. 154(b) by 282 days.

This patent is subject to a terminal disclaimer.

(21) Appl. No.: 14/951,874

(22) Filed: Nov. 25, 2015

(65) Prior Publication Data

US 2016/0075578 A1    Mar. 17, 2016

Related U.S. Application Data

(63) Continuation of application No. 14/087,912, filed on Nov. 22, 2013, now Pat. No. 9,227,863.

(60) Provisional application No. 61/907,142, filed on Nov. 21, 2013.

(51) Int. Cl.
   *C02F 3/08*  (2006.01)
   *C02F 3/06*  (2006.01)

(52) U.S. Cl.
   CPC ............. *C02F 3/087* (2013.01); *C02F 3/06* (2013.01); *C02F 2203/006* (2013.01); *C02F 2303/16* (2013.01); *Y02W 10/15* (2015.05)

(58) Field of Classification Search
   CPC ........ C02F 3/06; C02F 3/087; C02F 2303/16; C02F 2203/006; Y02W 10/15
   See application file for complete search history.

(56) References Cited

U.S. PATENT DOCUMENTS

| 4,547,286 A | 10/1985 | Hsiung |
| 4,800,021 A | 1/1989 | Desbos |
| 5,618,431 A | 4/1997 | Kondo et al. |
| 5,770,080 A | 6/1998 | Malone |
| 5,932,092 A | 8/1999 | Hawk et al. |

(Continued)

OTHER PUBLICATIONS

PCT Application No. US2014/066647; International Search Report and Written Opinion of the International Searching Authority for Applicant Ronald F. Malone dated Mar. 19, 2015.

(Continued)

*Primary Examiner* — Terry K Cecil
(74) *Attorney, Agent, or Firm* — Jones Walker LLP

(57) ABSTRACT

A water treatment system including a media filter having a filter chamber with a volume to accommodate filter media and a sludge outlet and a charge chamber for storing air. The charge chamber is fluidly connected to the filter chamber and has: (i) an air outlet for admitting air into the filter chamber; and (ii) an air inlet. The system also includes a trigger for selectively allowing the passage of air from the charge chamber air outlet into the filter chamber upon reaching a trigger release point and a sludge concentration/storage volume having at least one wall extending upward to form an upper opening. This wall has a height substantially above the trigger release point and substantially isolates the sludge volume from the charge chamber, except for the upper opening. Finally, an inlet to the sludge volume is at a height which allows pressure within the media filter during a filtration stage to move water above the wall height and into the sludge volume.

16 Claims, 30 Drawing Sheets

(56) References Cited

U.S. PATENT DOCUMENTS

| | | |
|---|---|---|
| 6,517,724 B1 | 2/2003 | Malone |
| 9,227,863 B2 * | 1/2016 | Malone .................. C02F 3/087 |
| 2003/0057152 A1 | 3/2003 | Haridas |
| 2005/0109697 A1 | 5/2005 | Olivier |
| 2009/0294356 A1 | 12/2009 | Beggs |
| 2015/0136667 A1 | 5/2015 | Malone |

OTHER PUBLICATIONS

U.S. Appl. No. 14/730,057 (Embedded Influent Diffuser for Floating Media Filter)—Examiner's Action dated Jan. 11, 2016.
U.S. Appl. No. 14/730,057 (Embedded Influent Diffuser for Floating Media Filter)—Examiner's Action dated Aug. 27, 2015.

* cited by examiner

BIOFILTRATION WITH ENHANCED SLUDGE HANDLING

CROSS REFERENCE TO RELATED APPLICATION

This application is a continuation of U.S. application Ser. No. 14/087,912 filed on Nov. 22, 2013, which claims the benefit of U.S. provisional application No. 61/907,142, filed on Nov. 21, 2013, both of which are incorporated by reference herein.

BACKGROUND

The present disclosure relates to media filtration systems and in particular embodiments, techniques for the handling of sludge created by these filtration systems.

Media filtration systems have become increasingly used in aquaculture, wastewater treatment, and other water treatment areas. In particular, air charged backwashing bioclarifiers employing floating media such as disclosed in U.S. Pat. No. 6,517,724 have proven to be a cost-effective system for treating water used in the above industries. However, the usefulness of such systems may be enhanced further with continued improvements in the methods of handling the sludge associated with these systems.

SUMMARY OF SELECTED EMBODIMENTS OF INVENTION

One embodiment of the present invention is water treatment system. The system includes a media filter having a filter chamber with a volume to accommodate filter media and a sludge outlet and a charge chamber for storing air. The charge chamber is fluidly connected to the filter chamber and has: (i) an air outlet for admitting air into the filter chamber; and (ii) an air inlet. The system also includes a trigger for selectively allowing the passage of air from the charge chamber air outlet into the filter chamber upon reaching a trigger release point and a sludge concentration/storage volume having at least one wall extending upward to form an upper opening. This wall has a height substantially above the trigger release point and substantially isolates the sludge volume from the charge chamber, except for the upper opening. Finally, an inlet to the sludge volume is at a height which allows pressure within the media filter during a filtration stage to move water above the wall height and into the sludge volume.

In one variation, the sludge volume is a sludge compartment positioned within the media filter. In another variation, the sludge volume comprises a sludge basin formed outside of the media filter.

Another embodiment has the charge chamber positioned in the media filter, while in an alternate embodiment, the charge chamber is positioned within the sludge basin.

As is clear from the many further embodiment disclosed below, nothing in this summary should be considered a limit on the scope of invention claimed.

DESCRIPTION OF SELECTED EMBODIMENTS

Figure 1:
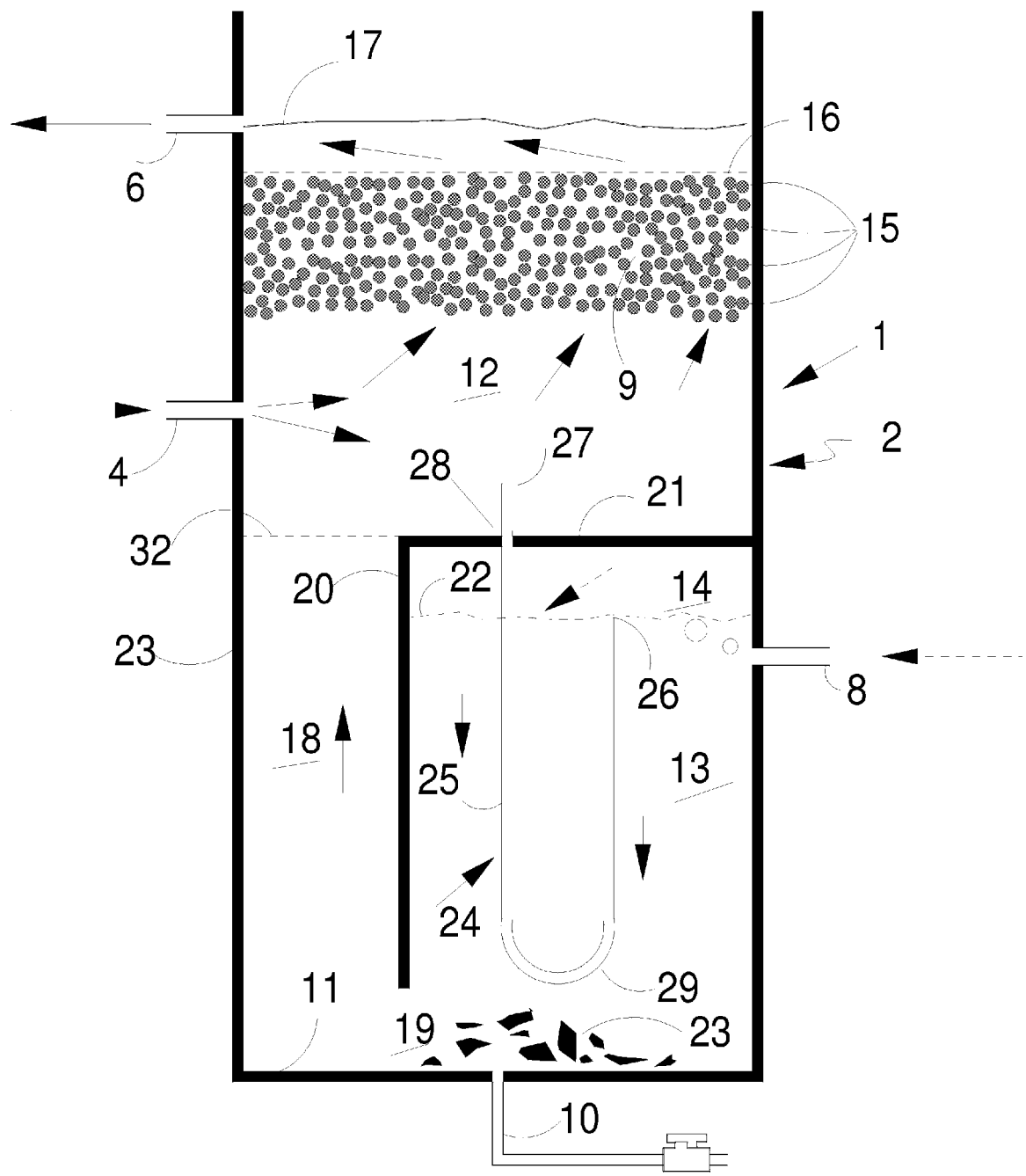
FIG. 1 illustrates a prior art floating media bioclarifier.

FIG. 1 illustrates a prior art air charged backwashing biofilter or bioclarifier such as disclosed in U.S. Pat. No. 6,517,724 (the Detailed Description, Drawings, and Claims of which are incorporated by reference herein in their entirety). The term "filter", "bioclarifier" and "biofilter" may be used interchangeably throughout this application. Likewise, "water" as used herein means wastewater or any water stream having foreign matter to be removed ("influent") and may also mean the treated water leaving the system ("effluent"). FIG. 1 illustrates a basic configuration of the prior art floating media biofilter 1. Biofilter 1 comprises a tank 2 having a wastewater or influent inlet 4, a treated water or effluent outlet 6, and a sludge outlet 10. In general, water flow through inlet 4 of this prior art biofilter is presumed constant through all phases of filter operation, the effluent flow through outlet 6 is somewhat variable due to the backwashing mechanism, and sludge removal is intermittent and usually not associated with a back washing event. Tank 2 will further comprise at least two compartments, filter chamber 12 and charge chamber 13. Filter chamber 12 will accommodate a bed 9 of floating filtration media 15. Floating media 15 will preferably comprise multiple low density granular media beads (or simply "beads") as described in U.S. Pat. No. 6,517,724, but many other types of media may be used.

Floating media 15 will form a media bed or pack 9 when tank 2 is filled with water or other liquid, and when media 15 are left undisturbed. A screen 16 or some other some other water permeable barrier will be positioned between effluent outlet 6 and floating media 15 to prevent the media beads from escaping tank 2 through effluent outlet 6.

Positioned in a lower section of tank 2 is a charge chamber wall 20 and 21 defining a charge chamber 13. Charge chamber 13 forms a substantially airtight enclosure along the length of wall 20 and 21. Formed between the outside wall 23 of tank 2 and charge chamber wall 20 is a settling area 18 through which water passes before entering charge chamber 13. In the embodiment shown in FIG. 1, wall 20 terminates in the approximate vicinity of the bottom 11 of tank 2. Between bottom 11 and wall 20 is water inlet passage 19 which will allow the transfer of water between filter chamber 12 and charge chamber 13 as will be explained in greater detail below. Generally, sediment falls to bottom 11 and is periodically removed through sludge outlet line 10.

An air inlet 8 will communicate with charge chamber 13 in order to allow the introduction of air into charge chamber 13. In many embodiments, air introduction through inlet 8 is generally continuous throughout all phases of filter operation. An air outlet 28 formed in top wall 21 will allow the intermittent transfer of air from charge chamber 13 to filter chamber 12. A trigger 24 for initiating this transfer of air will be positioned to communicate with the filter chamber 12 and a variable air pocket 14 which will be formed in charge chamber 13 above water level 22. In the embodiment shown in FIG. 1, trigger 24 is an air siphon 25 positioned inside of charge chamber 13. A first section of siphon 25 (discharge opening 27) extends through air outlet 28 to communicate with filter chamber 12. A second section of siphon 25 has an opening communicating through syphon inlet opening 26 with variable air pocket 14 in the interior space of charge chamber 13 and the lowermost section of siphon 25 has a bend or invert 29.

As described in U.S. Pat. No. 6,517,724, in the normal filtration mode, influent enters tank 2 through inlet line 4 at sufficient pressure that that effluent may exit through outlet line 6 after passing through the media bed. During filtration mode, air is slowly entering air inlet 8 and accumulating in air pocket 14. Air pocket 14 gradually increases in size, displacing water from charge chamber 13 and lowering the water level 22 in charge chamber 13. Air enters the siphon 25 through syphon inlet 26 until the water level is eventually forced down to the siphon invert 29. Air bubbles then enter the siphon column dropping the counter pressure restraining the air in air pocket 14. Air begins to rapidly escape from charge chamber 13 through siphon 25 and syphon discharge opening 27. As air exits charge chamber 13, water from filter chamber 12 will flow into charge chamber 13 through passage 19. The rapid displacement of air from charge chamber 13 to filter chamber 12 vigorously agitates the beads as media bed 9 is dropping toward the bottom of filter chamber 12 and thereby allowing excess bio-floc and trapped sediments to be removed from filter media 15. Water level 22 continues to rise until the air siphon inlet 26 is flooded filling the other siphon column, thus establishing a water column to counter pressure the air pocket 14. The pressure between filter chamber 12 and charge chamber 13 equalizes trapping the air in air pocket 14 As waste water continues to enter tank 2 through inlet 4, filter chamber 12 will fill and filter media 15 will float toward screen 16. When filter media 15 is restrained against screen 16, waste water will again flow through filter media 15 and exit tank 2 through outlet 6.

After water level 22 has reached its maximum level in charge chamber 13 during the backwashing cycle, water level 22 will drop at a comparatively slow rate as air enters charge chamber 13 through inlet 8. Thus charge chamber 13 is a relatively quiescent zone after water level 22 has reached its maximum level during the backwashing cycle. This allows charge chamber 13 to act as a primary clarifying area in which bio-floc is transported from filter media 15 to charge chamber 13 during backwashing, will be able to settle to the bottom of tank 2 to form a layer of "sludge" 23. The settling area 18 is also a quiescent zone which allows the settling of bio-floc particles which did not reach charge chamber 13 during backwashing. The sludge forming at the bottom of the bottom of charge chamber 13 is a semi-liquid layer having in the neighborhood of 0.5% to 2.0% solids. However, it will be understood that the definition of "sludge" is broad enough to include water having any concentration of solids (e.g., less than 0.5% or greater than 10%), where that solids containing water is transferred for the purposes of concentrating or removing solids from the treatment system.

Figure 2A:
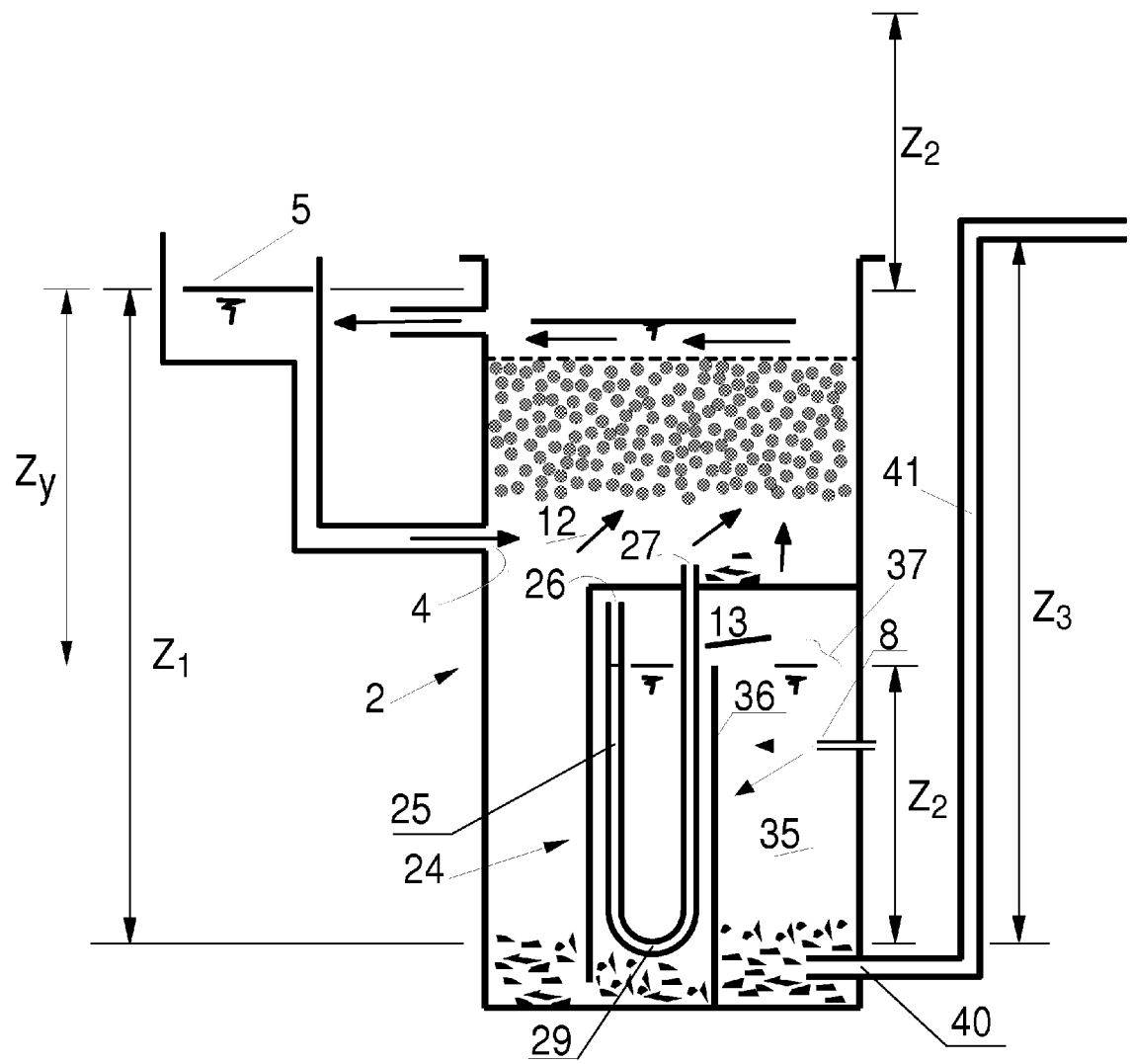
FIG. 2A illustrates one embodiment of the present invention.

FIG. 2A illustrates one embodiment of the present invention. The tank 2 seen in FIG. 2A is an air charged floating media filter having a filter chamber 12, a charge chamber 13, and a trigger 24. In the illustrated embodiments, trigger 24 is the syphon 25, but other triggers, whether based on mechanical, electrical or other operating mechanisms, may be employed. Any trigger device which will selectively allow air to be transferred from the charge chamber 13 to the filter chamber 12 may suffice, including the alternate triggers disclosed in U.S. Pat. No. 6,517,724. In many embodiments where the trigger is a siphon, the siphon inlet and outlet openings may be covered with screen or other suitable material. This screening material will most typically have an opening size that is small enough to assure exclusion of the filtration media.

Influent enters at tank inlet 4 from an influent feed height 5, i.e., the liquid level from which influent enters the filter and which determines the pressure (minus pipe losses) at inlet 4. The distance between influent feed height 5 and the bottom of the air pocket in charge chamber 13 (shown as $Z_Y$ in FIG. 2A) determines the pressure of the air in charge chamber 13. As the distance $Z_Y$ increases, the head pressure (i.e., fluid pressure represented as the height of a column of fresh water, e.g., one foot of head equals approximately 0.43 psi) in charge chamber 13 increases. In FIG. 2A, the distance from feed height 5 to the invert 29 of syphon 25 is represented by $Z_1$ and when the air in charge chamber 13 reaches this invert, the pressure may sometimes be referred to as the "siphon trigger head." This siphon trigger head may be more broadly considered as a "trigger release point." The trigger release point refers not only to a physical height of the siphon invert when describing a siphon type trigger, but may also refer to a water level for a trigger activated by water height or a pressure level for a trigger activated by a given pressure (e.g., a trigger formed of an electronically control valve activated by water level sensors or pressure sensors). In essence, the trigger release point is the instant when the trigger begins allowing air transfer from the charge chamber to the filter chamber.

Positioned within charge chamber 13 is a sludge accumulation compartment 35 (or sludge compartment). This embodiment of sludge compartment 35 is formed by a sidewall 36 extending upward from the bottom of charge chamber 13. At the top of sidewall 36, an upper opening 37 is formed in sludge compartment 35 such that (i) water entering charge chamber 13 during a backwash cycle will flow into sludge compartment 35 when the water level over-tops sidewall 36, and (ii) the interior of sludge compartment 35 is subject to pressurized air within charge chamber 13. It will be understood sidewall 36 extends laterally (i.e., into the plane of the paper in FIG. 2A) such that sludge compartment 35 forms a volume substantially isolated from charge chamber 13, except for upper opening 37. In the embodiment of FIG. 2A, sludge compartment 35 is shown positioned generally opposite fluid passage 19. However, sludge compartment 35 could be position at other locations within charge chamber 13, or even potentially partially or wholly external to charge chamber 13, provided that water entering charge chamber 13 and pressurized air in charge chamber 13 may communicate with that particular embodiment of sludge compartment 35.

The area of upper opening 37 and the volume of sludge accumulation compartment 35 influences the fraction of the suspended solids capture by the sludge compartment each cycle since the greater the volume of water entering the sludge compartment each cycle, the greater the faction of suspended solids tending to be captured. In many embodiments, the volume of sludge compartment 35 will generally be between about 25% and 40% of charge chamber 13. However, in other embodiments, the volume of sludge compartment 35 may be between about 10% and 90% of the charge chamber 13. As one non-limiting example, the ratio of media volume to total filter chamber volume to charge chamber volume may be 1 to 1.7 to 1.2. In many embodiments, the volume used for sludge compartment 35 is determined by considering the rate of sludge accumulations against the water loss constraints imposed on the system. For example, a wastewater unit that receives heavy loading yet directs the discharge 42 back to an upstream clarifier system (no discharge constraint) would employ a large sludge compartment 35, whereas, a marine recirculating system with relatively light loading could employ a smaller sludge compartment to increase the suspended solids density of discharges, thus conserving salt at a given feed rate. It will also be understood that if a substantial portion of the fluid in a comparatively large sludge accumulation compartment 35 is not discharged during a cycle, this remaining fluid may act to effectively reduce the volume of the charge chamber 13 available to hold air.

One characteristic of the filter media bed which may be calculated is the "bed porosity volume;" i.e., the total volume of the pore spaces between the media beads when formed in a floating bed. In many embodiments of the invention, the volume of the sludge accumulation compartment is at least approximately equal to (e.g., 80% of), and more typically greater than, the bed porosity volume for that particular filter design. However, other embodiments can also have a sludge accumulation compartment with a volume less than the bed porosity volume.

The height of sidewall 36 could vary substantially. In the illustrated embodiments, it will be set below the air siphon inlet 26 elevation. In many embodiments, sidewall 36 will be set only a few inches below the air siphon inlet 26 elevation just allowing spacing to assure a good cascade of solids laden waters into sludge compartment 35 while maximizing the potential sludge lift (as described in detail below). However, the sidewall 36 elevation may also be considerably lower if a lower sludge lift is acceptable in a particular design application and the top area of 35 becomes more important in the solids capture mechanism as solids settle out of overlying waters shortly after a backwash event. For example, the height of sidewall 36 could be anywhere between about 30% and about 95% of the distance between siphon insert 29 and siphon inlet 26.

The siphon inlet 26 elevation may sometimes be referred to as the "trigger closure point." Like the trigger release point, the trigger closure point refers not only to a physical height of inlet 26 when describing a siphon type trigger, but also to a water level or a pressure level for trigger closure in an electronic or mechanical trigger controlled by water level or pressure. In essence, the trigger closure point is the instant where the trigger ceases allowing air transfer from the charge chamber to the filter chamber. FIG. 2A illustrates the wall 36 height in sludge compartment 35 (above the siphon invert 29) elevation as $Z_2$. It is understood that the sidewalls of sludge accumulation compartment 35 maybe inclined or attached to a structure other than a wall of media filter 2 or charge chamber wall 25. However, in preferred embodiments, it is desirable for design purposes to maintain a base elevation (in one example the siphon invert) for establishing the elevation of other structures throughout the system.

The sludge outlet 40 is formed approximate the bottom of sludge compartment 35. The precise height of sludge outlet 40 above the bottom of sludge compartment 35 is not critical, but it will be apparent from the operational description below that it advantageous for most embodiments to position sludge outlet 40 at or near the bottom of sludge compartment 35. More particularly, in most embodiments, the top invert of the sludge outlet will be below (generally ½" is sufficient) the invert elevation of air siphon 25 to prevent air escape through sludge line 41. The sludge line 41 communicates with outlet 40 and in the embodiment of FIG. 2A, extends upward to terminate in the sludge discharge port 42. In preferred embodiments, a lower portion of sludge line 41 (either at the sludge outlet 40 or somewhere along its path to discharge port 42) will be below the siphon invert 29. The diameter of sludge line 41 is not critical, but it is often preferred to employ the smallest pipe that can be used without clogging concerns. Aquarium scale filters with bead beds measured in liters typically employ tubing with ⅜-½" inner diameter ("ID"), whereas wastewater units with bead volumes of 50-100 ft³ would employ pipe ID's of 3-4 inches. As explained below, the height of the sludge line 41 between above siphon invert 29 and discharge port 42 ($Z_3$ in FIG. 2B) is a significant parameter in the movement of sludge out of the filter system.

Figure 2B:
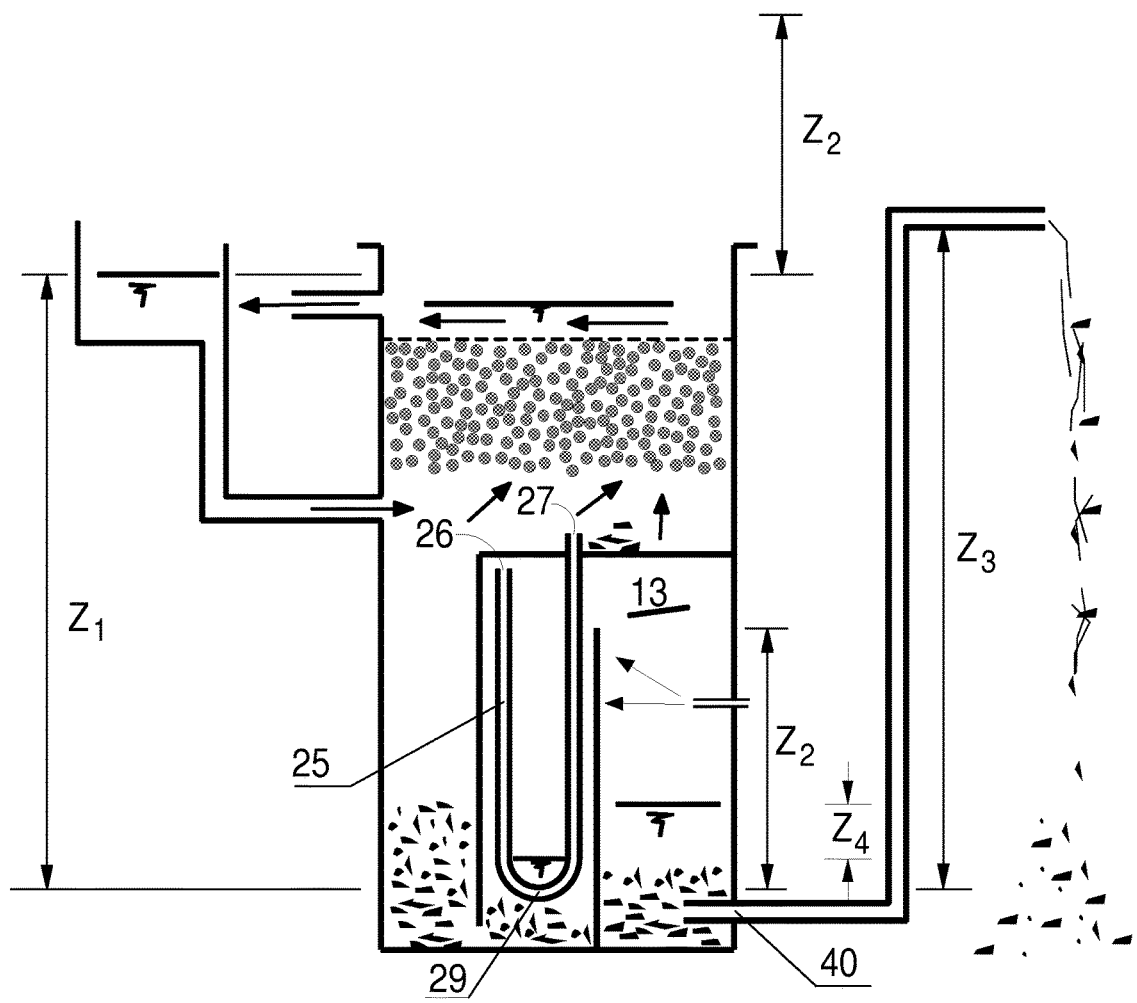
FIG. 2B illustrates the FIG. 2A embodiment during the filtration stage.
Figure 2C:
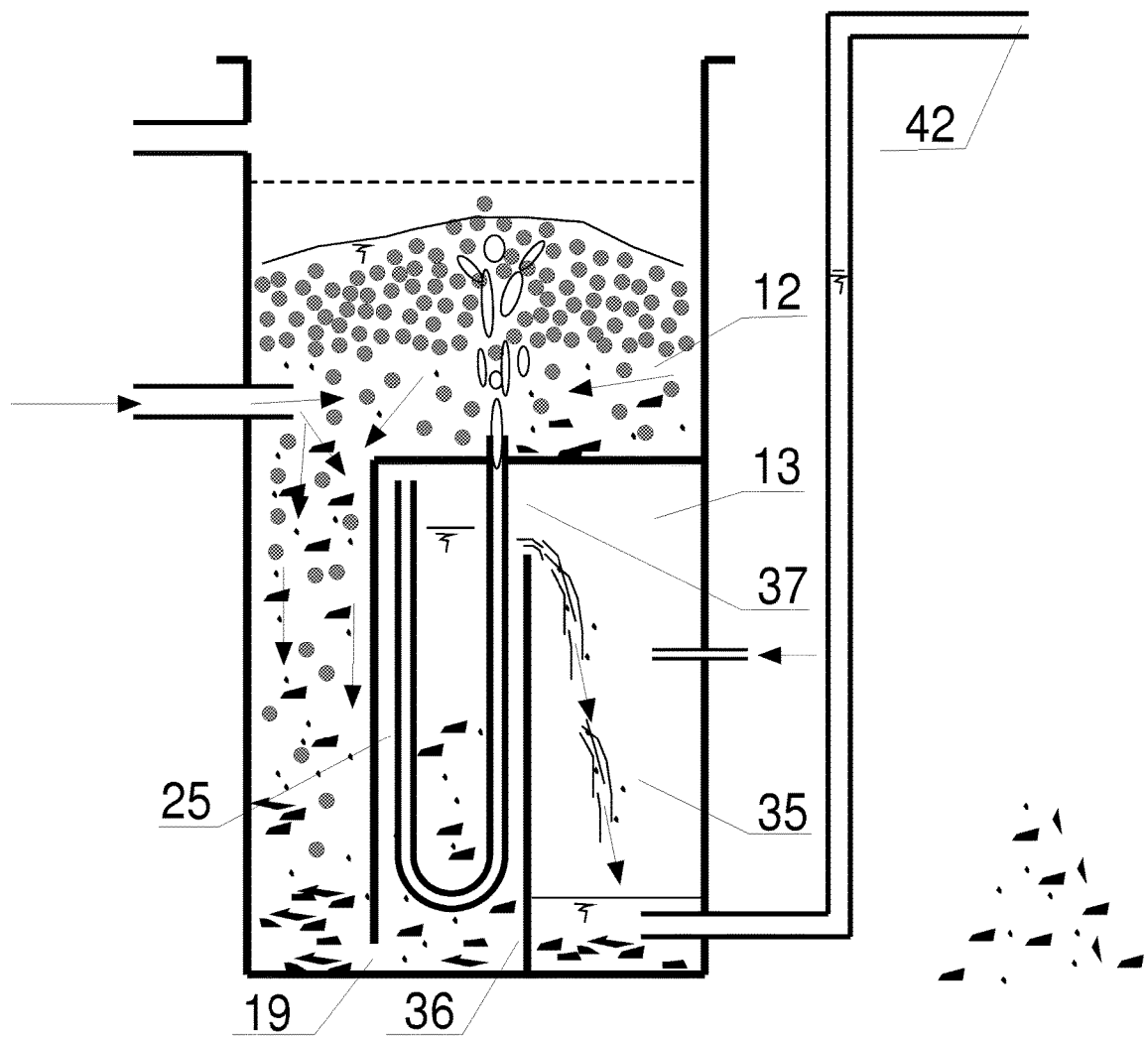
FIG. 2C illustrates the FIG. 2A embodiment during the backwash stage.

Two operational stages of filter 1 are suggested by FIGS. 2B and 2C. In FIG. 2B, air has been building in charge chamber 13 and is approaching siphon invert 29 which will trigger the siphon and the backwashing cycle. At the moment prior to siphon 25 triggering, it will be understood that the air pressure in charge chamber 13 is approximately equal to the column of water between the influent feed height 5 and the water level in the charge chamber (e.g., $Z_1$ when the charge chamber water level is at the siphon invert 29). Likewise, it will be understood that the pressure at sludge outlet 40 will be equal to the air pressure in charge chamber 13 plus the column of water $Z_4$ in sludge compartment 35, i.e., will be equal to the head of $Z_1+Z_4$. Therefore, during the time in which the head of $Z_1+Z_4$ exceeds that height of discharge port 42 (i.e., the height above siphon invert 29, $Z_3$), sludge in compartment 35 will be moved up sludge line 41 and out of discharge port 42. In the illustrated embodiments, $Z_3$ normally should be greater than $Z_1$ to prevent constant drainage of the sludge basin. There are possibly specialized embodiments where $Z_3$ is somewhat less than $Z_1$ (e.g., an aquaponics system discussed below). In many embodiments, $Z_3$ will be between approximately 0.2 ft and 1.0 ft higher than $Z_1$. In other embodiments, the sludge discharge port is between about 0.3 $Z_2$ and about 0.8 $Z_2$ higher than $Z_1$. However, still further embodiments could have a discharge port height $Z_3$ slightly less than or greater than either of these ranges above $Z_1$ depending on particular design goals. It will be readily understood that with a given height of $Z_1$ and $Z_2$, the height of sludge discharge port 42 may be adjusted to control the period of time during which sludge volume discharges while charge chamber 13 fills with air prior to the backwash cycle.

FIG. 2C illustrates the stage where the siphon 25 has triggered allowing air in charge chamber 13 to discharge through siphon 25 into the filter chamber 12 and allowing water to flow into charge chamber 13. The water is shown as having risen above sidewall 36 to allow the water to flow into sludge compartment 35. It may be visualized how water moving rapidly downward from filter chamber 12 and through fluid passage 19 will tend to entrain sludge previously accumulated on the bottom of charge chamber 13 and move that sludge into sludge compartment 35 as the water over-tops sidewall 36. Further, any solids that remain suspended above opening 37 after the backwash event will settle into sludge compartment 35. Thus, the backwash cycle provides a reliable, cyclical mechanism for continually moving significant amounts of sludge from the bottom of the charge chamber 13 into the sludge compartment 35. It will be understood that during and immediately after the backwash cycle, the head moving sludge through discharge port 42 has been removed. This is advantageous since during and immediately after backwashing, the sludge in sludge compartment 35 is generally suspended in the water. After the backwash cycle, in the early portion of the filtration stage, the filter returns to a normal filtering mode and charge chamber 13 slowly refills with air, and the suspended sludge in compartment 35 has the opportunity to settle and concentrate before charge chamber 13 again fills with sufficient air to begin pushing the sludge out through discharge port 42 in the late portion of the filtration stage. The interval between backwash events generally ranges anywhere from 1 to 72 hours depending mostly on influent loading to the biofilter. Typically, this will allow sufficient time for solids to concentrate into the 2-3 percent range with the unmodified sludge accumulation area of this embodiment.

Figure 2D:
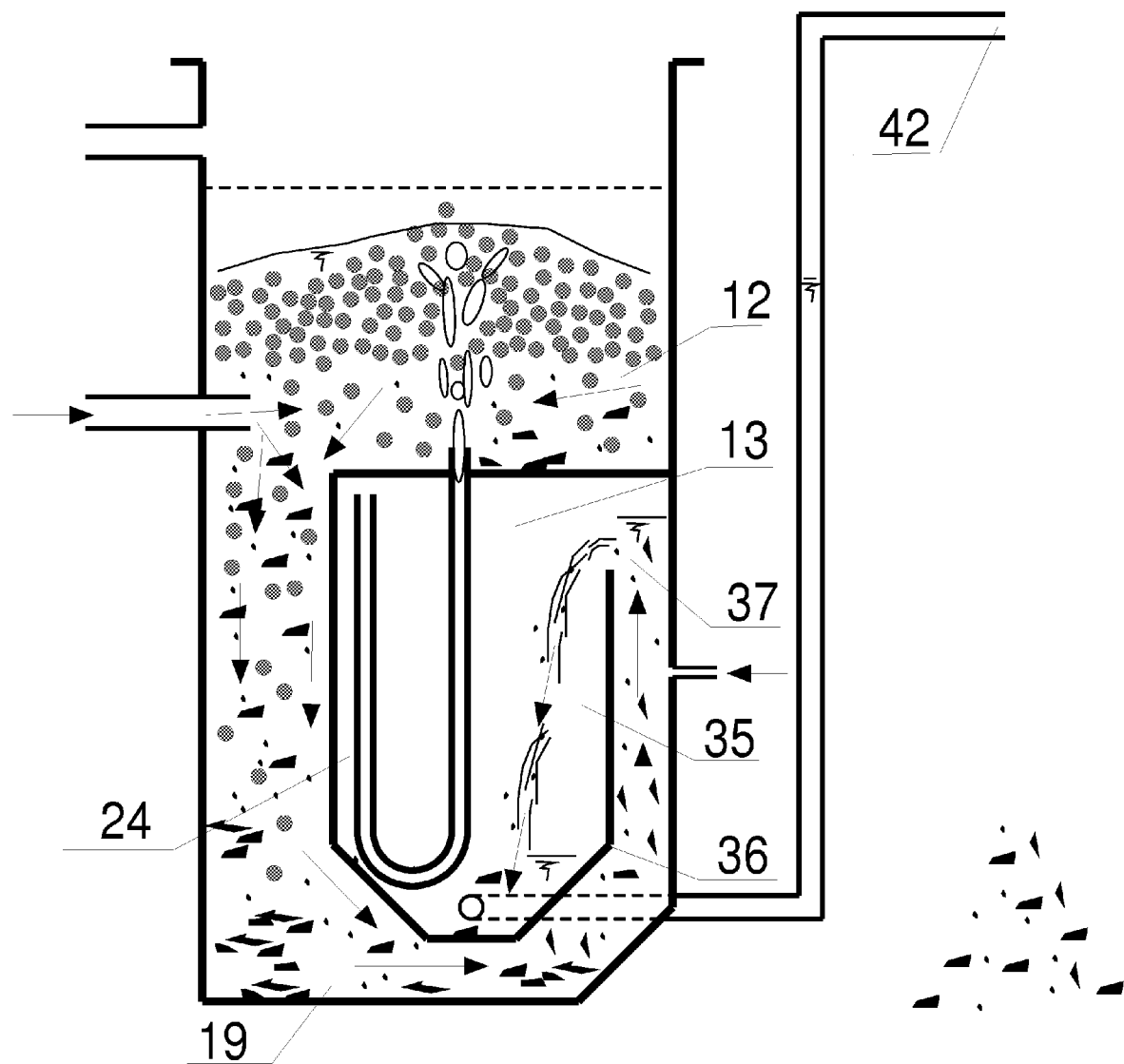
FIG. 2D illustrates an alternative sludge accumulation compartment.

FIG. 2D illustrates a modified embodiment of FIG. 2A. In the FIG. 2D embodiment, the sludge accumulation compartment 35 is raised off the bottom of the media filter and fluid passage 19 extends beneath the sludge accumulation compartment. This is an effective design for creating a sludge accumulation compartment that approaches the volume of the charge chamber, giving this design a large discharge "stroke volume," i.e., the volume of sludge moved from the sludge accumulation compartment out of discharge port 42 during a filtration/backwash cycle. Other embodiments described above will often have a smaller stroke volume, e.g., less than the bed porosity volume of the media bed. For example, the stroke volume of a FIG. 2A embodiment will often be between 20% and 80% of the bed porosity volume.

Figure 2E:
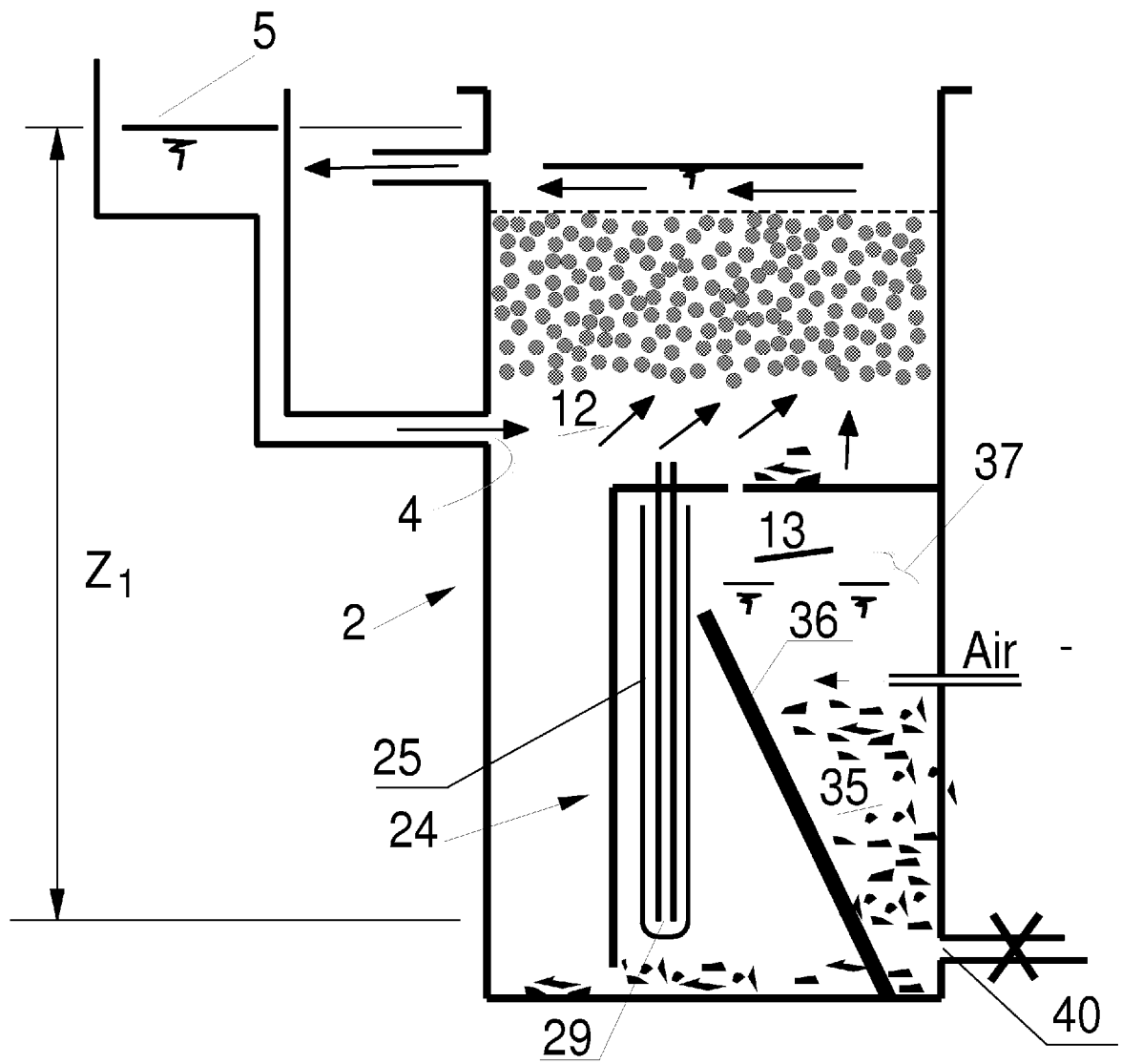
FIG. 2E illustrates a sludge accumulation compartment formed with an inclined sidewall.

FIG. 2E illustrates a still further modification of FIG. 2A. In FIG. 2E, sidewall 36 is inclined at an angle (e.g., 45°, 60°, or 75°) such that the lower portion of sludge accumulation compartment 35 is narrower and the upper opening 37 is wider. This design has the dual advantages of concentrating the sludge near sludge outlet 40 and providing a larger area for upper opening 37 to capture solids when the water level rises above the height of wall 36. FIG. 2E also differs from other embodiments in that siphon 25 is of the concentric type.

Figure 3A:
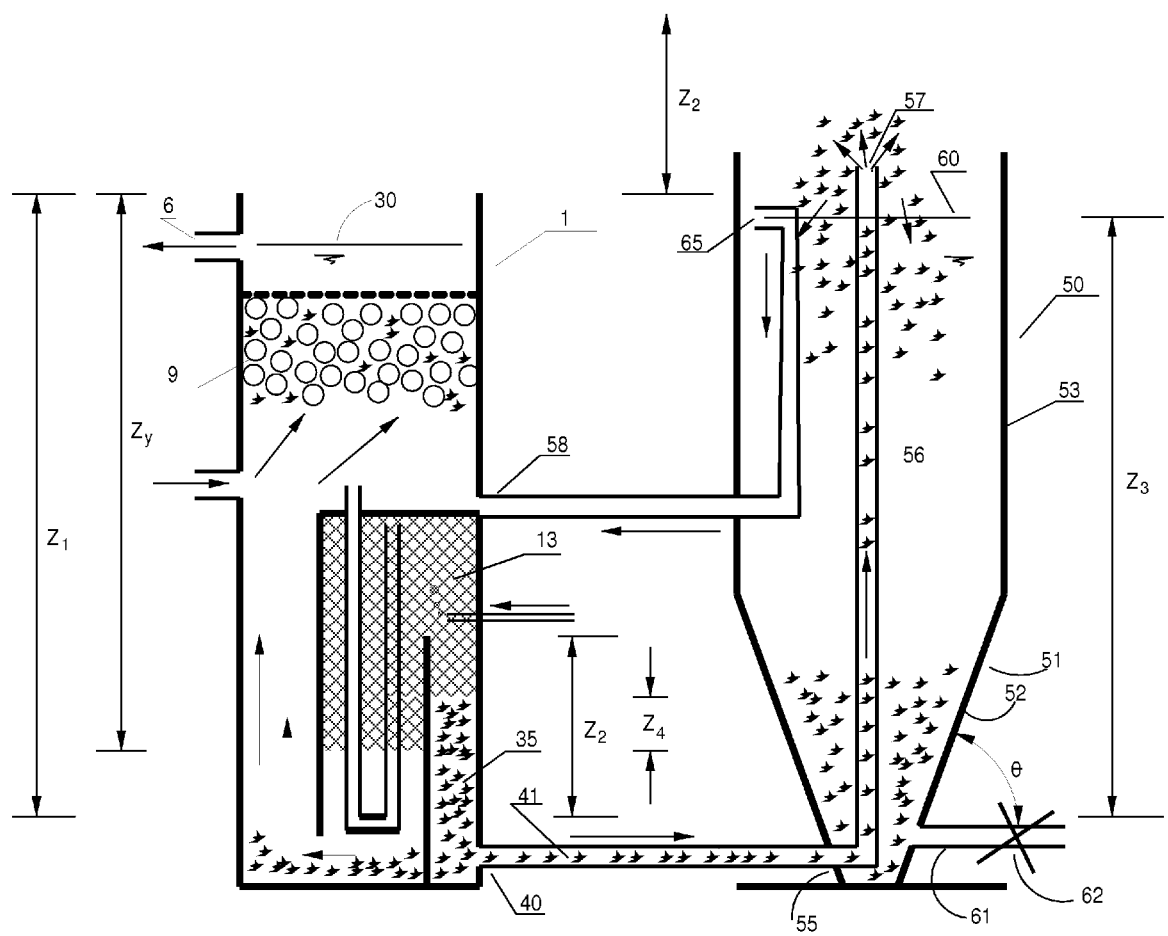
FIG. 3A illustrates another embodiment of the present invention.
Figure 3B:
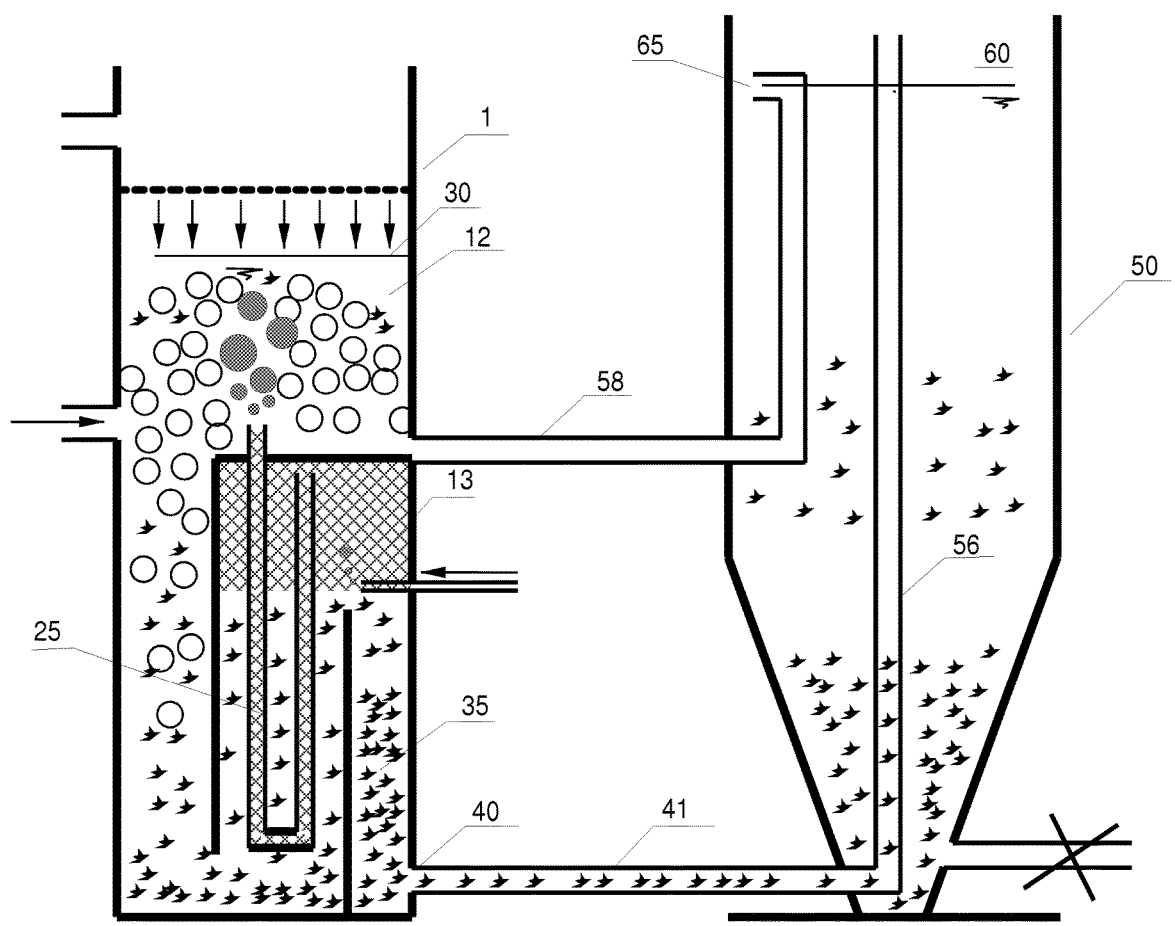
FIG. 3B illustrates the FIG. 3A embodiment during the backwash stage.
Figure 3C:
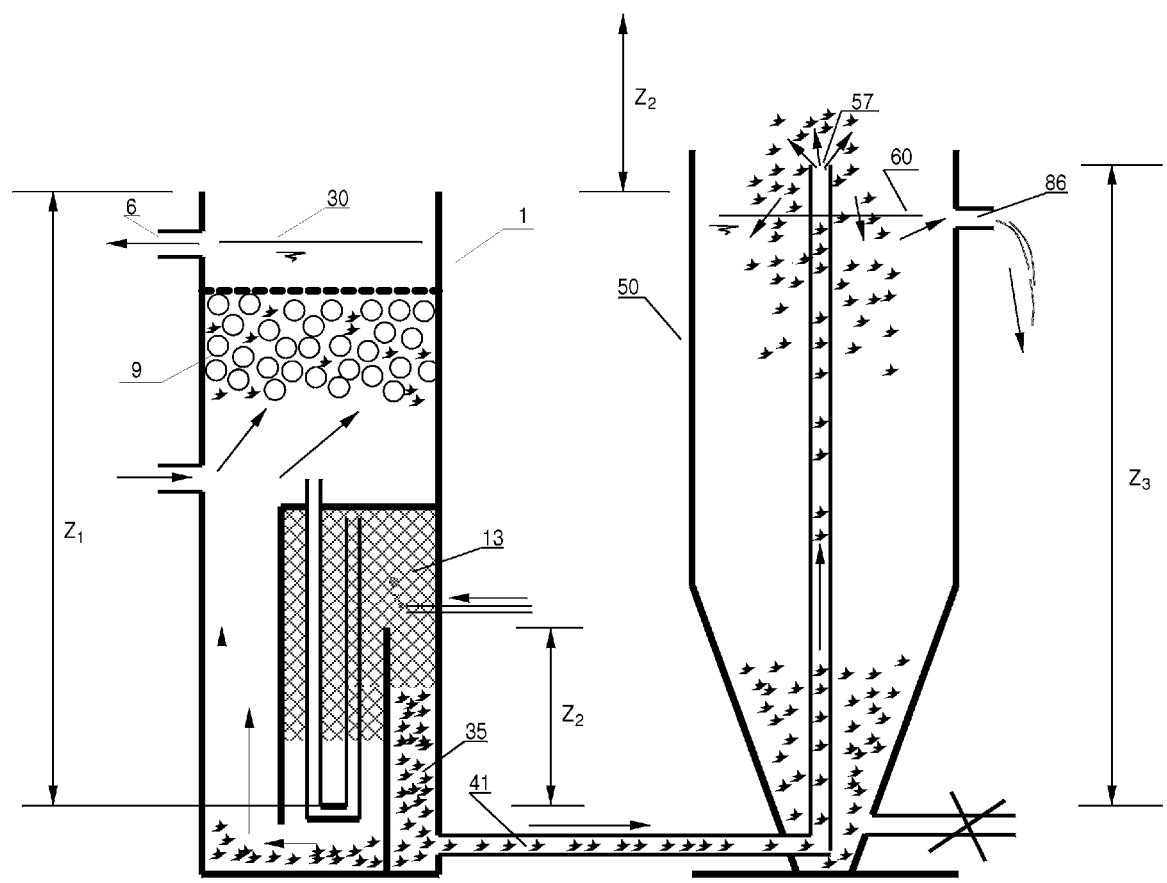
FIG. 3C illustrates an embodiment similar to FIG. 3A, but with an open discharge port on the sludge basin.

A second embodiment of the invention comprises a water treatment system as seen in FIGS. 3A to 3C. FIG. 3A illustrates the water treatment system having a floating media filter 1 similar to that of FIG. 2A, which includes the sludge accumulation compartment 35. However, this embodiment of the water treatment system further employs a sludge concentration/storage basin (or simply "sludge basin") 50. This embodiment of sludge basin 50 is illustrated as a separate vessel having no walls in common with media filter 1. However, in alternate embodiments, the media filter 1 and sludge basin 50 could be integrally formed and share a common wall (e.g., see FIG. 7). In FIG. 3A, sludge basin 50 includes the upper cylindrical section formed by wall 53 and lower conical section 51 formed by the sloping sidewalls 52. As suggested in FIG. 3A, sloping side wall 52 forms an angle theta with the horizontal in order to act as a sludge concentration area for basin 50. In one embodiment, theta is at least 30°, but in other embodiments theta could be 45°, or 60°. Similarly it may be possible for theta to be lower than 30° or greater than 60° (or any angle between 30° and 60°). Naturally, the lower section of sludge basin 50 could have sloping sidewalls with geometric shapes other than an inverted cone; for example the lower section could take on an inverted hemisphere shape, inverted pyramid shape, or a rectangular wedge shape as in FIG. 7. Although a sloped surface on the lower portion is preferred in many embodiments, there may also be embodiments where there is not a sloped surface (e.g., a sludge basin which is a straight cylindrical shape along its entire length). In the embodiment of FIG. 3A, a sludge discharge line 61 with valve 62 communicates with the lower area of conical section 51 to allow concentrated sludge to be periodically withdrawn from the system FIG. 3A illustrates two conduits connecting media filter 1 and sludge basin 50. First sludge line 41 runs from media filter sludge outlet 40 to sludge basin inlet 55. Thereafter, the sludge line continues with vertical section 56 which terminates at discharge port 57. In the illustrated embodiment, discharge port 57 is positioned sufficiently high that it remains above the basin fluid level 60 during the normal filtering stage of the treatment system. However, other embodiments could have discharge port 57 somewhat below fluid level 60. In addition to sludge line 41, this embodiment of the treatment system includes an equalization passage 58 which communicates with media filter 1 at a point above charge chamber 13 and with sludge basin 50 at a point above the lower conical section 51. Although the exact location of equalization passage 58 may vary, preferred embodiments will have equalization passage 58 communicating with media filter 1 at a location where water is transferred to the area of filter chamber 12 and communicating with sludge basin 50 through equalization passage inlet 65 at a point where flows through the equalization passage 58 will not unduly interfere with sludge settling process in conical section 51. Thus, the exact positioning of equalization passage inlet 65 is not generally critical.

FIG. 3A illustrates the flow of fluid through the treatment system during the normal filtering stage of operation. During normal filtering, influent is progressing through filter media bed 9 and exiting at outlet 6 while air is building in charge chamber 13. Similarly, as the pressure in charge chamber 13 represented by head $Z_y$, combined with head $Z_4$, exceeds head $Z_3$, fluidized sludge from sludge compartment 35 will flow through sludge line 41 and exit discharge port 57. To the extent that fluidized sludge being received by sludge basin 50 would tend to increase basin fluid level 60, fluid will flow slowly through equalization passage 58 into media filter 1. Likewise, head losses through the filter media will normally result in fluid level 30 being somewhat lower than fluid level 60, irrespective of the flow through equalization passage 58.

FIG. 3B illustrates the stage at which media filter 1 is backwashing with air rapidly flowing from charge chamber 13, through siphon 25, and into the filter chamber. The charge chamber discharge is generally timed by sizing the diameter of air siphon 25 such that air exits the chamber in a 5 to 15 second interval. To the extent that the fluid level 60 is above inlet 65, excess fluid rapidly returns to media filter 1. However, once fluid level 60 is below inlet 65, fluid in sludge basin 60 plays no further role in media filter 1's backwash cycle.

FIG. 3C illustrates a slightly different embodiment where there is no equalization passage 58. Instead, there is the ex-system discharge outlet 86 which directs the fluid outside the treatment system (in this example, at atmospheric pressure). One use for this embodiment would be an aquaponics application when the discharge is directed to irrigate crops or the like. Normally, where the height of discharge port 57 is greater than Z1, water will exit discharge outlet 86 only when discharge of sludge occurs through discharge port 57 during the late portion of the filtration stage. However, if the $Z_3$ height of discharge port 57 is equal to or somewhat less than $Z_1$, then a greater volume of water is discharged from outlet 86 during most of the filtration stage (assuming outlet 86 is also at or below $Z_1$).

Figure 3D:
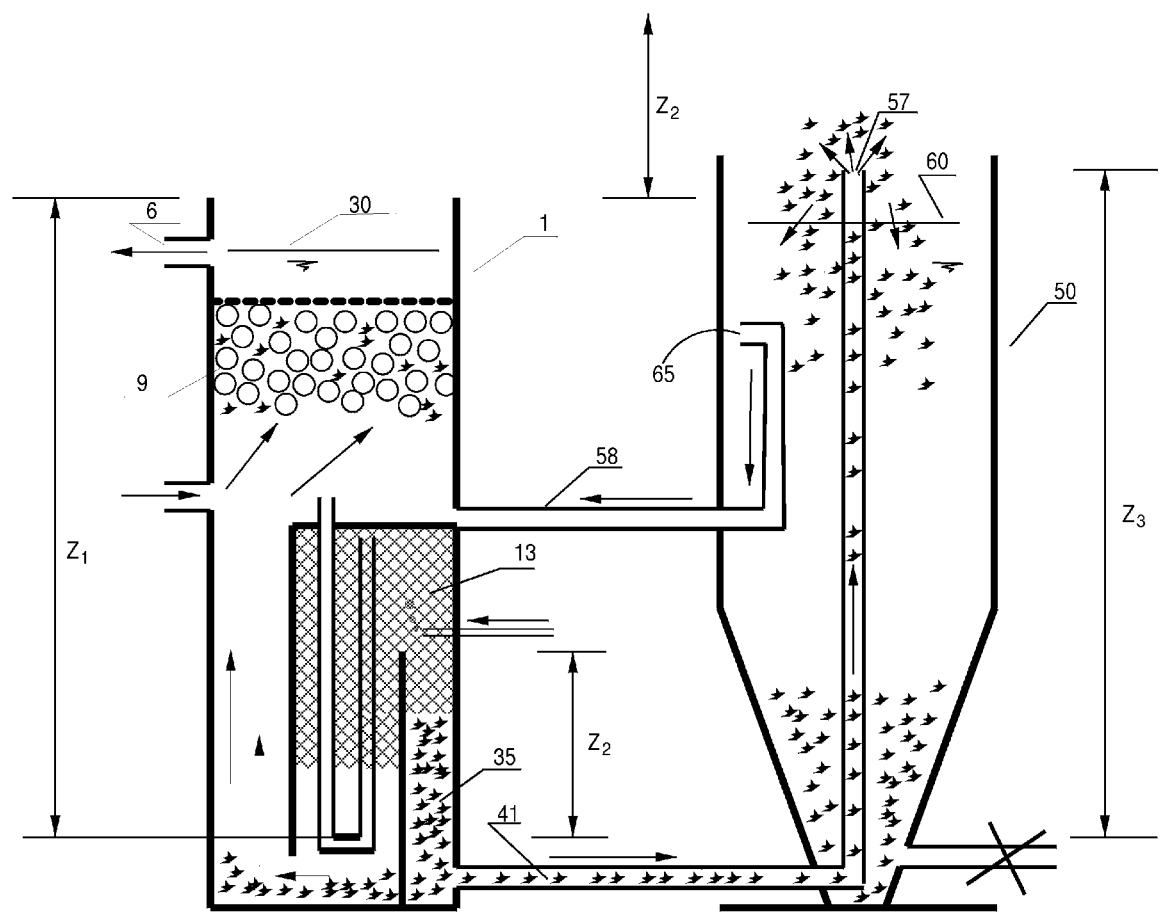
FIG. 3D illustrates an embodiment with the return conduit modified from FIG. 3A.
Figure 3E:
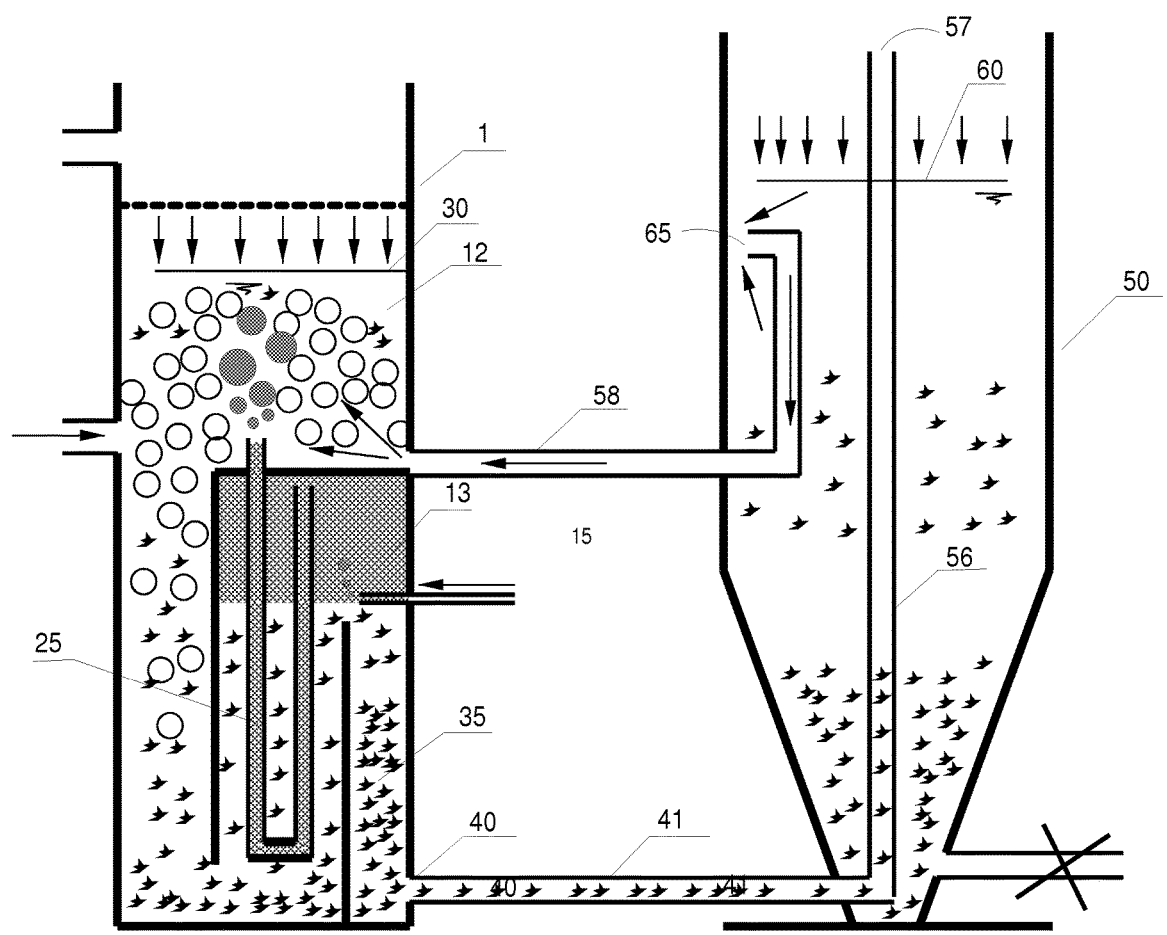
FIG. 3E illustrates the embodiment of FIG. 3D during a backwash stage.

FIGS. 3D and 3E illustrate a variation where equalization passage inlet 65 is position significantly below the sludge basin fluid level 60. When incoming sludge tends to raise fluid level 60 during the filtration stage, fluid will return to media filter 1 via equalization passage 58 similar to the FIG. 3A embodiment. However, during the backwash stage as suggested in FIG. 3E, the rapid drop of fluid level 30 causes a comparatively strong movement (e.g. with a peak velocity>2 ft/sec) of water from sludge basin 50, through equalization passage 58, and into filter chamber 12 of the media filter. Likewise, a small amount of water in sludge line 41 will tend to reverse flow back into sludge compartment 35 until the head in vertical sludge line 56 equals the pressure at sludge outlet 40. Depending on the height of inlet 65, this inlet may remain submerged through the range of heights fluid level 60 varies during operation of the treatment system. In many embodiments, equalization passage 58 will be sized to allow a peak fluid velocity of between about 2 and 3 ft/sec to assure pipe scour. It will be understood that as media filter 1 recovers from backwashing and re-establishes its normal (filtration stage) fluid level 30, fluid reverses flow direction in equalization passage 58 and moves from filter media 1 to sludge basin 50. However, since discharge port 57 remains above sludge basin fluid level, sludge only moves into sludge concentrated storage basin 50 through the action of the charge chamber 13 air pressure on sludge accumulation compartment 35. The primary benefit of the embodiment illustrated in FIGS. 3D and 3E is increased scour experienced by the equalization passage 58.

Figure 3F:
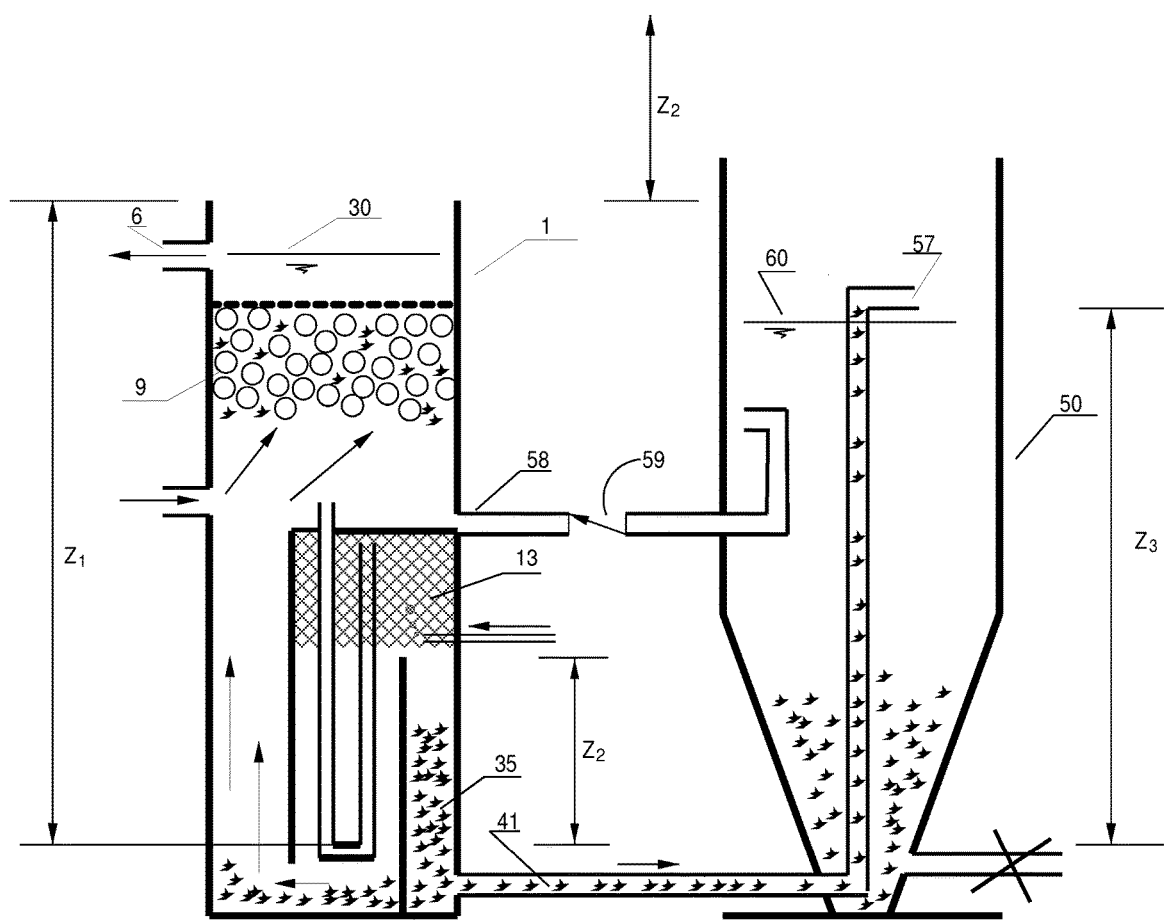
FIG. 3F illustrate an embodiment with a one-way valve positioned in the return conduit.
Figure 3G:
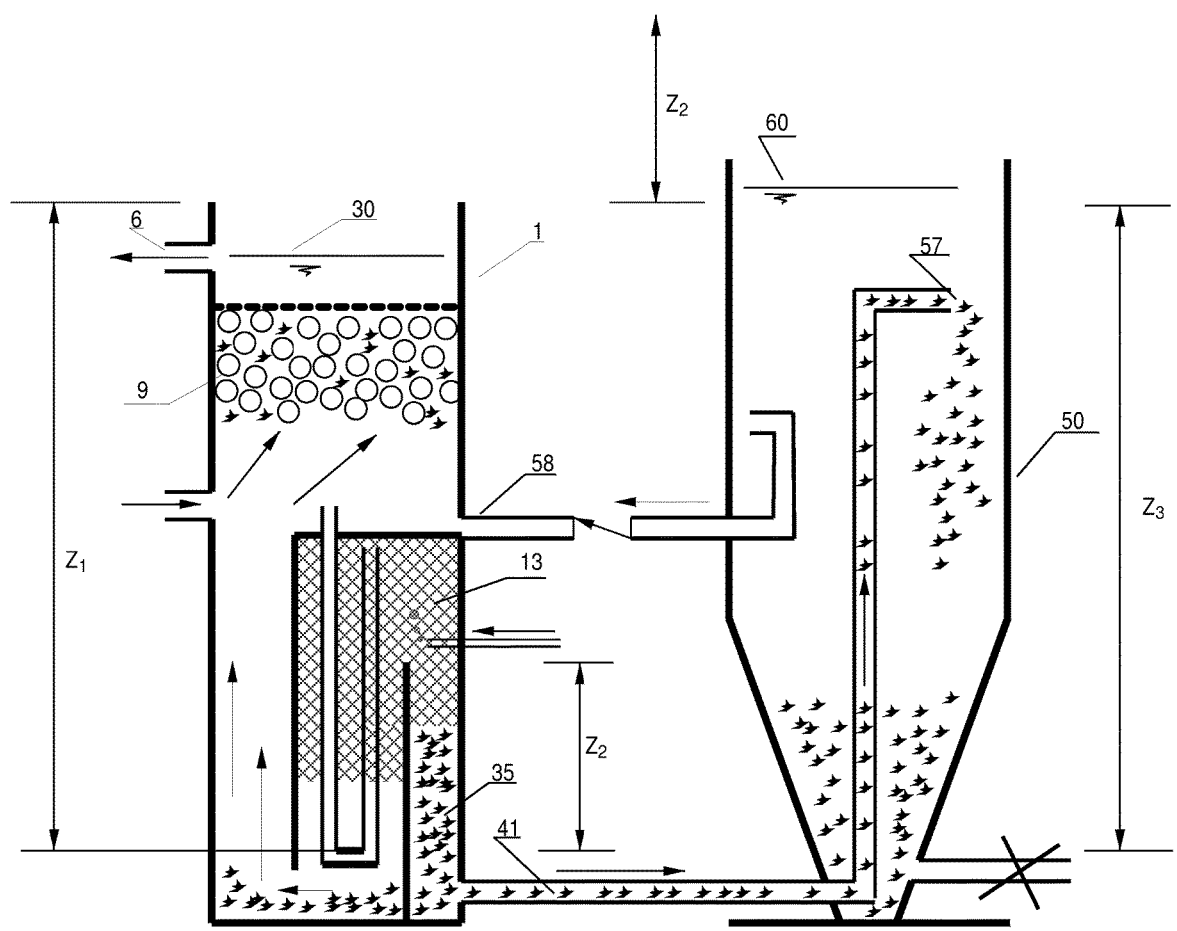
FIG. 3G illustrates the embodiment of 3F at a later filtration stage.
Figure 3H:
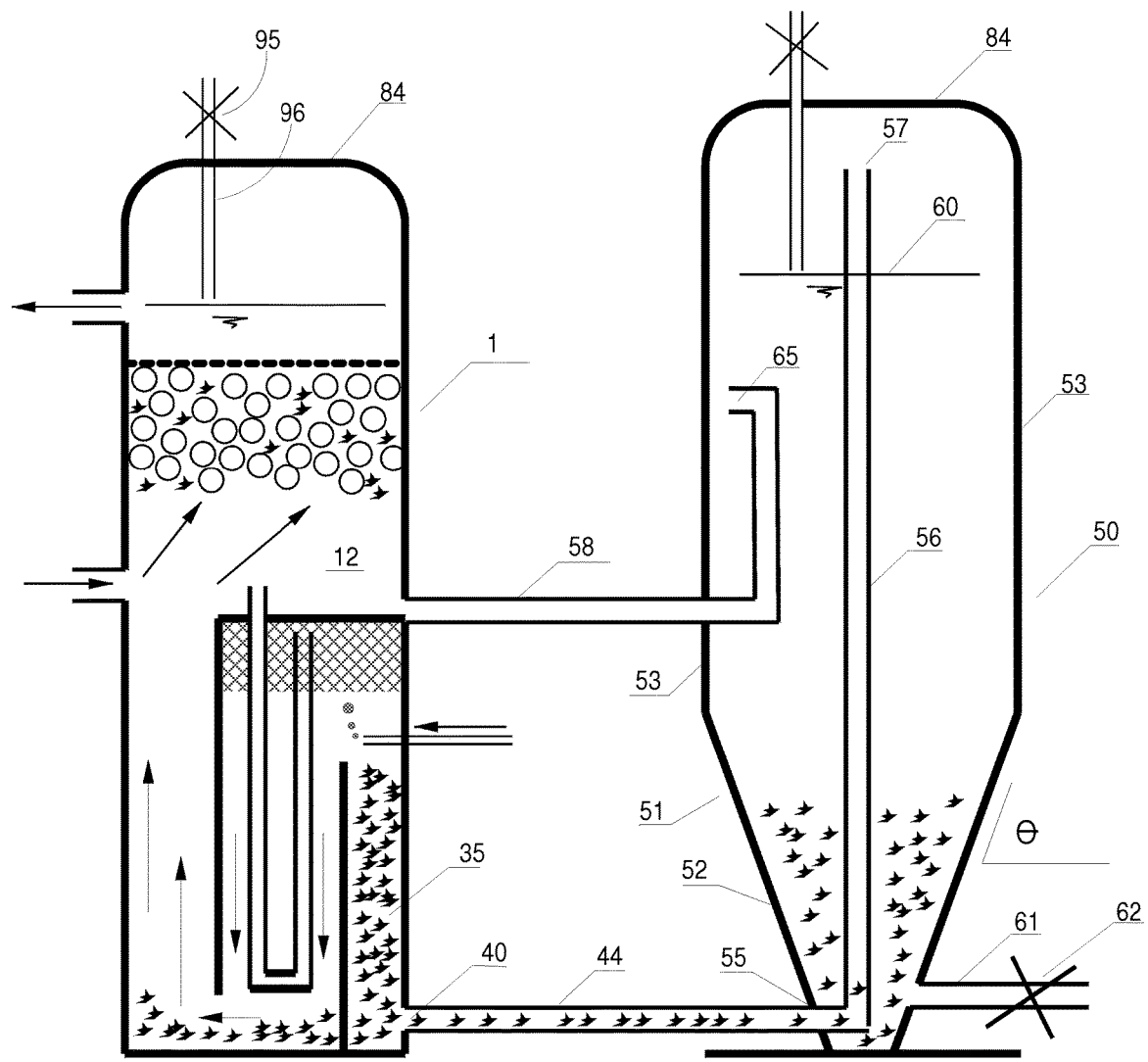
FIG. 3H illustrates a pressurized version of the embodiment of FIG. 3F.

FIGS. 3F to 3H illustrate a further variation in the embodiment of 3A. FIG. 3F shows the equalization passage 58 with the one-way valve or check valve 59 which allows fluid flow only in the direction from sludge basin 50 to media filter 1. FIG. 3F shows the drop in fluid level 60 that will occur shortly after a floating media filter 1 refills after a backwash. Sludge discharge port 57 is placed just above the lowered sludge basin fluid level 60. The low placement of discharge port 57 just above the post backwash sludge basin water level 60 transitionally reduces the effective height of $Z_3$ (i.e., the hydraulic head acting on the outlet of sludge accumulation compartment 35) to the point that sludge may move through sludge line 41 into sludge basin 50 prior to the air pocket in charge chamber 13 impacting the sludge accumulation basin 35 since $Z_3$ is initially less than $Z_1$. However, as the sludge basin fluid level rises the discharge port 57 becomes submerged and the height of the sludge basin fluid level 60 defines $Z_3$ and it equalizes with $Z_1$. Thereafter, sludge will be moved by air in charge chamber 13 acting on fluid in sludge accumulation compartment 35 as illustrated in FIG. 3G with excess waters returning to filter 1 via 58. The combination of sludge movements has the net effect of increasing the rate of sludge movement into the sludge basin 50. Lowering sludge discharge outlet 57 increases the maximum pressure differential that can be exerted on the sludge as it is moved through sludge line. This higher pressure helps assure that sludge 41 does not clog with excessively thick sludge. Finally, the check-valve 59 prevents the potential migration of beads from filter chamber 1 to sludge basin 50 through equalization passage 58.

FIG. 3H illustrates a version of the FIG. 3A embodiment intended for use where the filter system preferably operates under positive pressure, e.g., when the media filter effluent is intended for transfer under pressure to a further treatment stage or to a higher elevation discharge. In this embodiment, both the media filter 1 and sludge basin 50 have pressure covers 84. In this embodiment, both vessels also include an air relief valve 95 communicating with an air tube 96. The air relief valve will act automatically to release positive air pressure (or let in air if a vacuum exists) within the filter or sludge basin, but will block a liquid flow if the water level rises that high. For example, sludge digestion may release gas which creates an undesirable degree of pressure in sludge basin 50 in the absence of air relief valves 95. Air tube 96 extends downward into the media filter and/or sludge basin and may also act to resist the rise of the water level. When the water level reaches the open end of tube 96, air is blocked from escape through air relief valve 95. The compressible nature of the air pocket can be beneficial in the backwashing behavior of the floating media filter as it creates cushion that encourages faster movement of the noncompressible waters at early moments of trigger discharge. Within the sludge concentrated sludge storage basin 50, the air pocket depth can allow the establishment of an elevation difference between the sludge discharge 57 and the sludge basin fluid level 60. This small differential influences the behavior of the sludge movement from the sludge accumulation compartment 35 into sludge concentrated storage basin 50. Thus, further rise in the water level will cause increasing air pressure in the space between water level 60 and pressure cover 84. One preferred example of an air relief valve 95 is a Netafim ¾" Guardian Air/Vacuum Relief vent (Model No. 65ARIA075), available from Netafim USA, of Fresno, Calif., which is used in irrigation practice. However, alternate embodiments of the invention may include pressure covers without air relief valves or pressure covers on only one of the hulls (filter media or sludge basin).

The embodiments of FIGS. 3A to 3H provide certain advantages over that of FIG. 2A. First, they eliminate water loss constraints on the movement of solids by allowing backwash frequency to be increased without increased loss of water. Second, they increase the height available to consolidate solids by moving the solids inlet to the top of sludge basin 50. This factor, together with a conical bottom section, increases achievable solids concentration to the about 6% to 10% range. The separate storage basin also makes longer periods between sludge removal more practical and allows for further sludge digestion.

In certain embodiments, the treatment systems seen in FIGS. 3A to 3H (and other figures herein) are advantageous because they can operate effectively with the bottom of media filter 1 and the bottom of sludge basin 50 resting at approximately the same elevation and not require a pump for the transfer of sludge from the media filter to the sludge basin. For example, recirculating aquaculture production facilities may contain 30-40 independent filter-tank combinations to avoid catastrophic loss in the case of disease introduction. Recirculation is accomplished with airlift pumps driven by air from a blower maintained in a dry mechanical room external to the wet production facility. This embodiment allows the sludge to be lifted out and concentrated sludge discharges from the building can be reduced without the addition of 30-40 sludge pumps and associated controls. In systems where tanks are operated in small blocks of 4-5 tanks to optimize production, sludge generated from the 4-5 filters can be collected in a single sludge holding tank where digestion can be encouraged. Anoxic sludge decay in the sludge basin with return of the supernatant has the beneficial effect of denitrifying waters and thus delaying nitrate accumulations that often limit water reuse. In any case, this embodiment allows the use of deep sludge concentration cones or basins for airlift operated systems (no water pumps) without the need to break through an existing floor (e.g., concrete) in order to bury the cones at the appropriate grade.

Figure 4A:
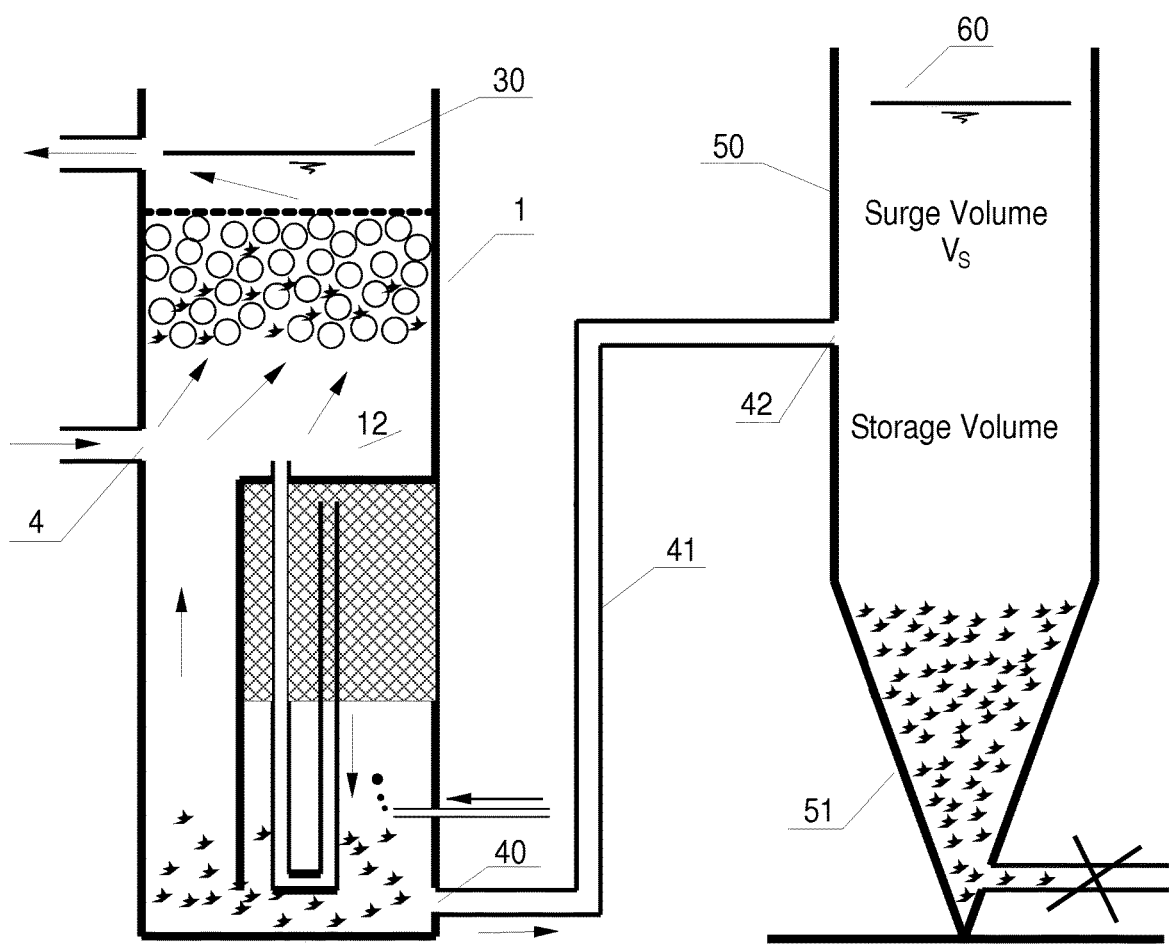
FIG. 4A illustrates a further embodiment of the present invention.

A further embodiment of the present invention is seen in FIGS. 4A to 4E. In this embodiment, media filter 1 does not include the sludge accumulation compartment seen in earlier figures and sludge will collect generally at the bottom of the filter as suggested in FIG. 4A. A sludge line 41 extends from sludge outlet 40 to sludge discharge port 42 (also the "sludge inlet" for sludge basin 50) which communicates with sludge basin 50 at a point above conical section 51. FIG. 4A illustrates a portion of sludge basin 50 above discharge port 42 which is designated "surge volume" $V_S$. During the filtering stage of operation, the pressure at sludge outlet 40 of media filter 1 remains substantially constant and the sludge basin water level 60 is at a height providing a head equal to the pressure at sludge outlet 40.

Figure 4B:
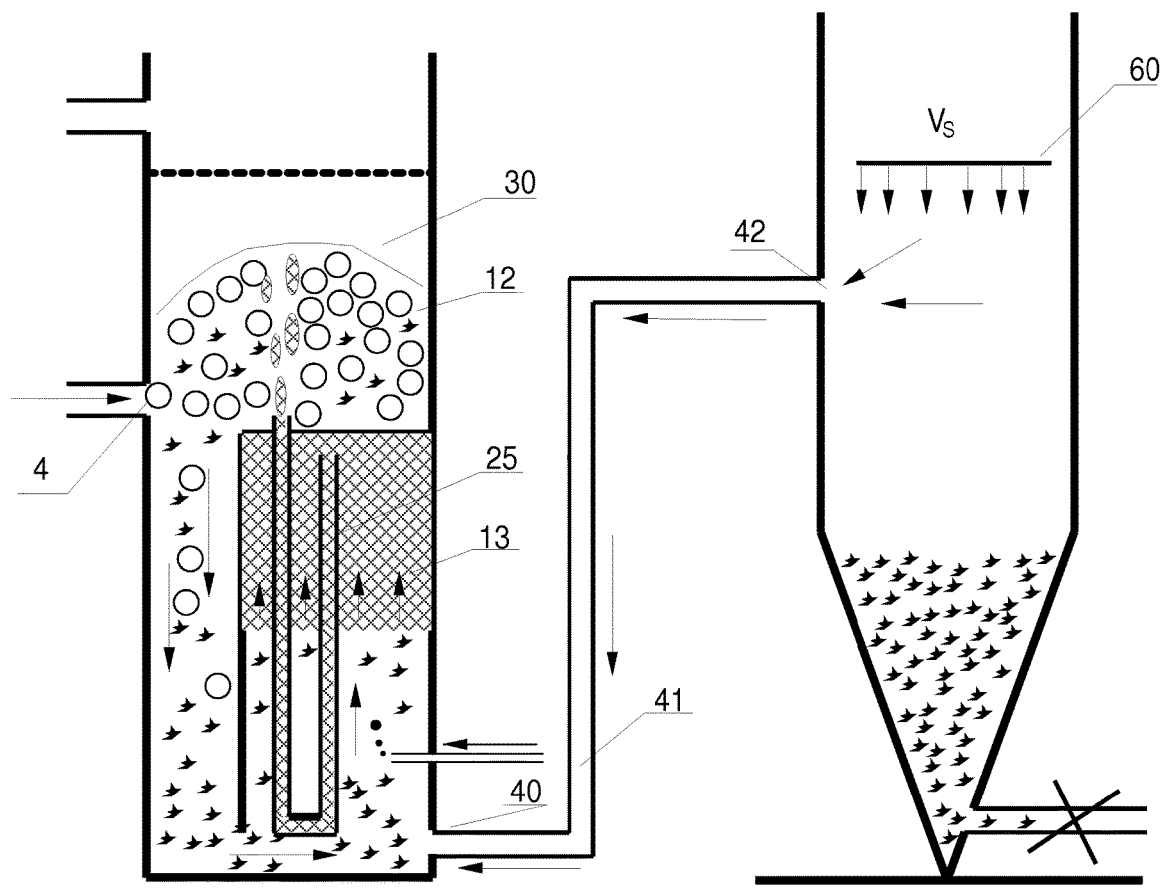
FIG. 4B illustrates the FIG. 4A embodiment during the backwash stage.

FIG. 4B illustrates the flow of water in this embodiment during a backwash cycle. As air escapes charge chamber 13 though siphon 25, water begins replacing the escaping air. The water flows not only from filter chamber 12, but also comparatively solids free water from the surge volume $V_S$ falls through sludge line 41 into charge chamber 13. It is desirable to achieve a drop in sludge basin water level 60 of at least 4-6" establish a suitable head differential across sludge line 41 to insure movement of sludge. It is also often desirable to size the line 41 in FIG. 4 embodiments sufficiently large that the volume of fluid transferred from the sludge basin to the media filter will be completed prior to the media filter starting to refill with water in the final portion of the backwash cycle. As air ceases to discharge from charge chamber 13, water from influent inlet 4 begins rapidly raising the water level 30 in media filter 1. As the water level 30 rises in the filter chamber, water in the bottom of media filter 1 is reversed pushing toward sludge outlet 40, through sludge line 41, and into sludge basin 50 as suggested in FIG. 4C. The sludge concentrated water will continue to move into sludge basin 50 until the water level 60 rises sufficiently for its head pressure to equal that at sludge outlet 40. Achieving an exchange volume exchange (i.e., the volume of fluid moving from the charge chamber to the sludge basin) in the range of about 5-20 percent (dependent on backwash frequency) of the charge chamber 13 discharge volume is generally sufficient to minimize sludge storage in charge chamber 13. However, other embodiments typically may have an exchange volume exchange of up to about 80%. The backwash event, including the exchange of surge volume is accomplished in 15 to 30 seconds in many embodiments.

With water level 60 returned to its normal (filtering stage) level, more quiescent conditions exist in sludge basin 50 and the sludge recently brought to the sludge basin will settle out of the sludge surge volume into the lower conical portion of sludge basin 50 where is will further digest and consolidate over several backwash events. It can be visualized how each backwash cycle will transfer some amount of sludge from media filter 1 to sludge basin 50. Notably, this transfer of sludge is effected solely by the motive or driving force of the backwash cycle and no pump interfaces or control valves (or "closeable" valves) are associated with sludge line 41. As used herein "control valves" or "closeable valves" mean values that can be open or closed, whether manually or by automated means (e.g., a solenoid operated valve). A check valve or similar valve which functions without any human or electronic intervention is not considered a control valve or a closeable valve. In sum, the sludge transfer is driven solely by the pneumatic and hydraulic effects of the charge chamber filling and discharging without any pumps, closeable valves, or other mechanical/electronic control mechanisms between the filter media and the sludge basin.

Figure 4C:
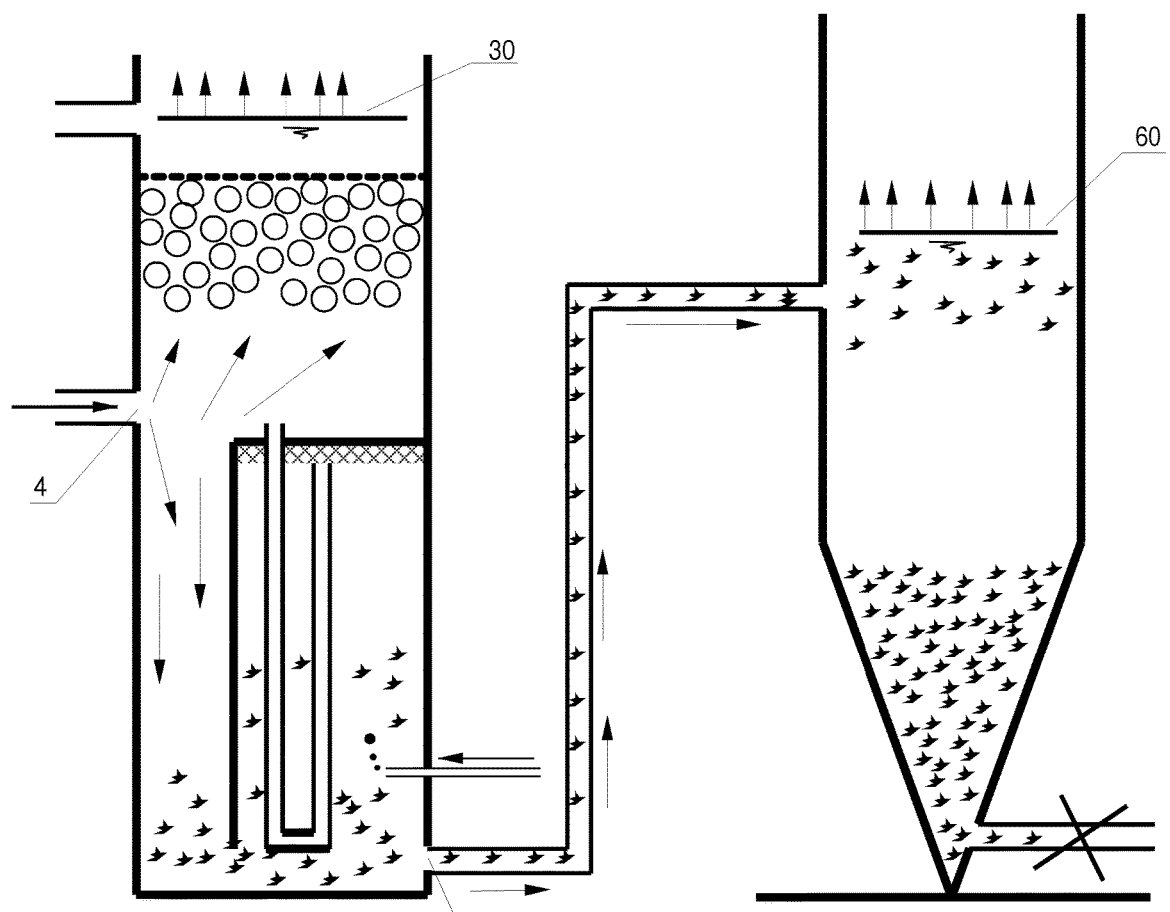
FIG. 4C illustrates the FIG. 4A embodiment shortly following the backwash stage.
Figure 4D:
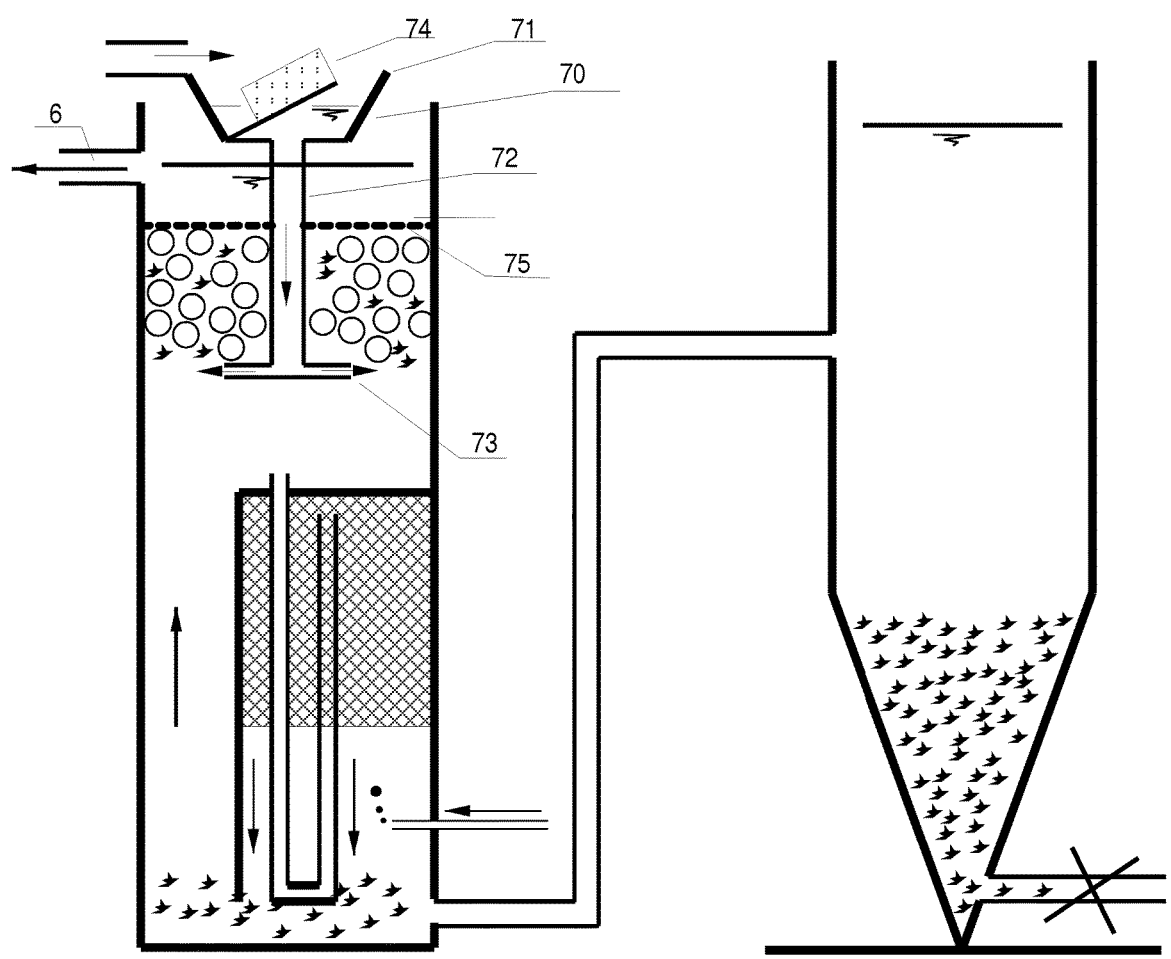
FIG. 4D illustrates a further embodiment during the filtration state.
Figure 4E:
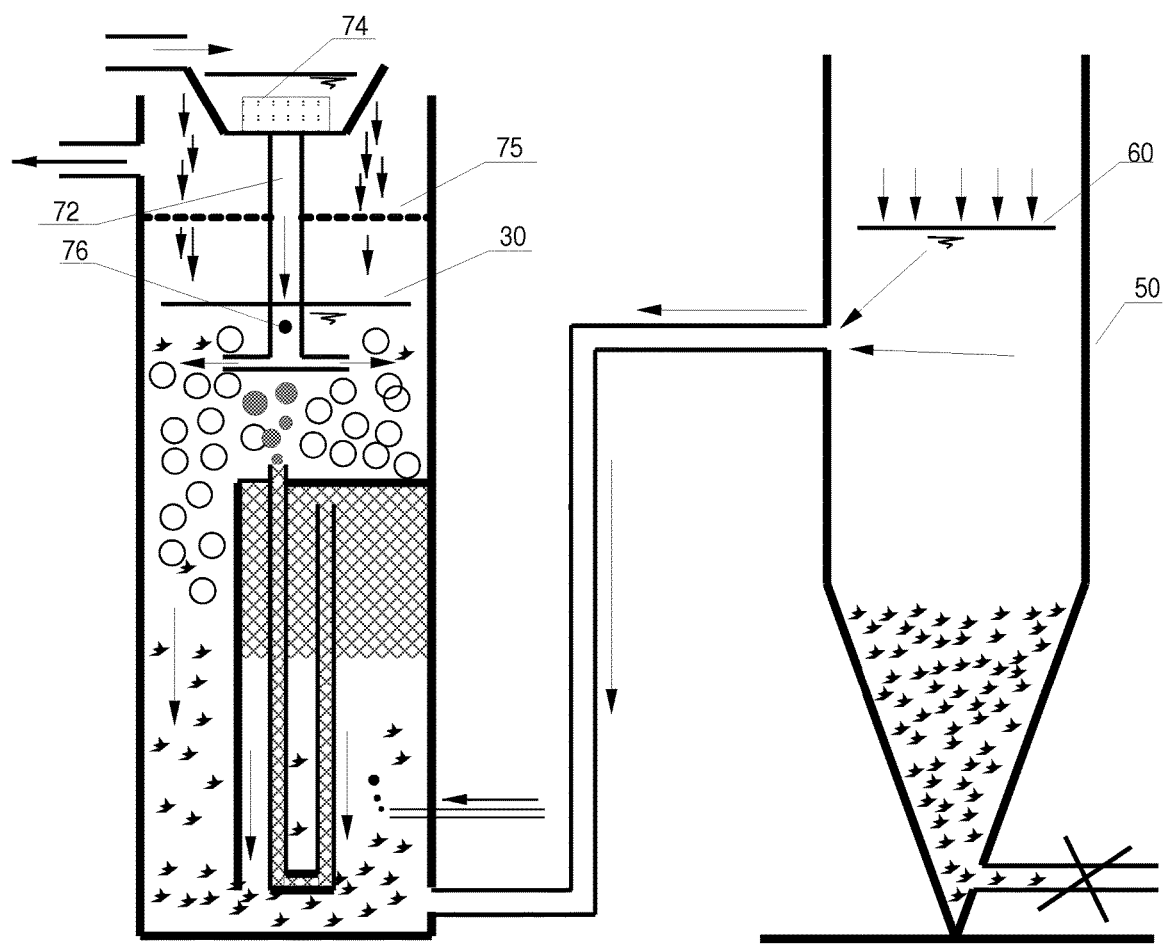
FIG. 4E illustrates the FIG. 4D embodiment during the backwash stage.

FIGS. 4D and 4E illustrate a modification to the embodiment in FIGS. 4A to 4C. In FIG. 4D, the influent is introduced via the counter flow influent system 70, which generally comprises delivery trough 71, downflow conduit 72, flow diffuser 73, and floating flapper valve 74. In the normal filtering stage, influent is directed to overflow trough 71 and while there is sufficient fluid to keep flapper valve 74 in the raised (floating) position, into flow diffuser 73 which distributes the influent beneath the filter media bed. Media retention screen 75 constrains the upward movement of the floating media and effluent leaves the system through fluid outlet 6. The size of overflow trough 71, downflow conduit 72, and buoyancy of flapper valve 74 may be adjusted such that the design influent flow rate maintains a steady-state flow of influent beneath the filter media bed without flowing over the edges of overflow trough 71.

When this embodiment enters the backwash cycle as suggested in FIG. 4E, the rapid drop of filter fluid level 30 allows the fluid in overflow trough 71 to drain though downflow conduit 72 faster than it may be replaced at the normal influent flow rate. Thus, flapper valve 74 closes and blocks downflow conduit 72, causing overflow trough 71 to fill and ultimately overflow onto the backwashing filter media as suggested in FIG. 4E. The water overflowing onto the filter media from overflow trough 71 provides a further cleaning force and agitation of the media in order to remove bio-floc from the media elements. It will be understood that as filter fluid level 30 drops further after the closing of flapper valve 74, a lower pressure condition may be created in downflow conduit 72 which tends to hold flapper valve 74 in the closed position. This lower pressure condition in downflow conduit 72 may maintain the closure of flapper valve 74 (and thus overflowing from overflow trough 71) longer than is desirable. Thus in one embodiment, breather aperture 76 is formed in downflow conduit 72 such that the lower pressure condition is relieved once water level 30 drops beneath breather aperture 76. In other embodiments, where charge chamber sizing allows (i.e., if the charge chamber size allows the water level to fall below the diffuser), the inlet diffuser is used to break the conduit 72 suction. In one example, the breather aperture 76 is positioned such that flapper valve 74 will be released and influent overflow terminated as the air discharge from charge chamber 13 is substantially complete and the filter media has fallen to a point below the diffuser element 73 on downflow conduit 72. The initial delay as the trough 71 fills (2-3 seconds) allows the fluid in sludge basin 50 surge volume to more fully drain. Whereas, the sudden release of the trough waters as the conduit 72 suction is broken by the breather hole 76 increases the head differential between water level 30 and 60 accelerating the movement of sludge from filter 1 into sludge basin 50 as described in regards to FIGS. 4A to 4C. Often in FIG. 4 type embodiments, it is desirable to minimize sludge retention in the bottom of the media. This may be accomplished through increasing the frequency of backwash events.

Figure 5A:
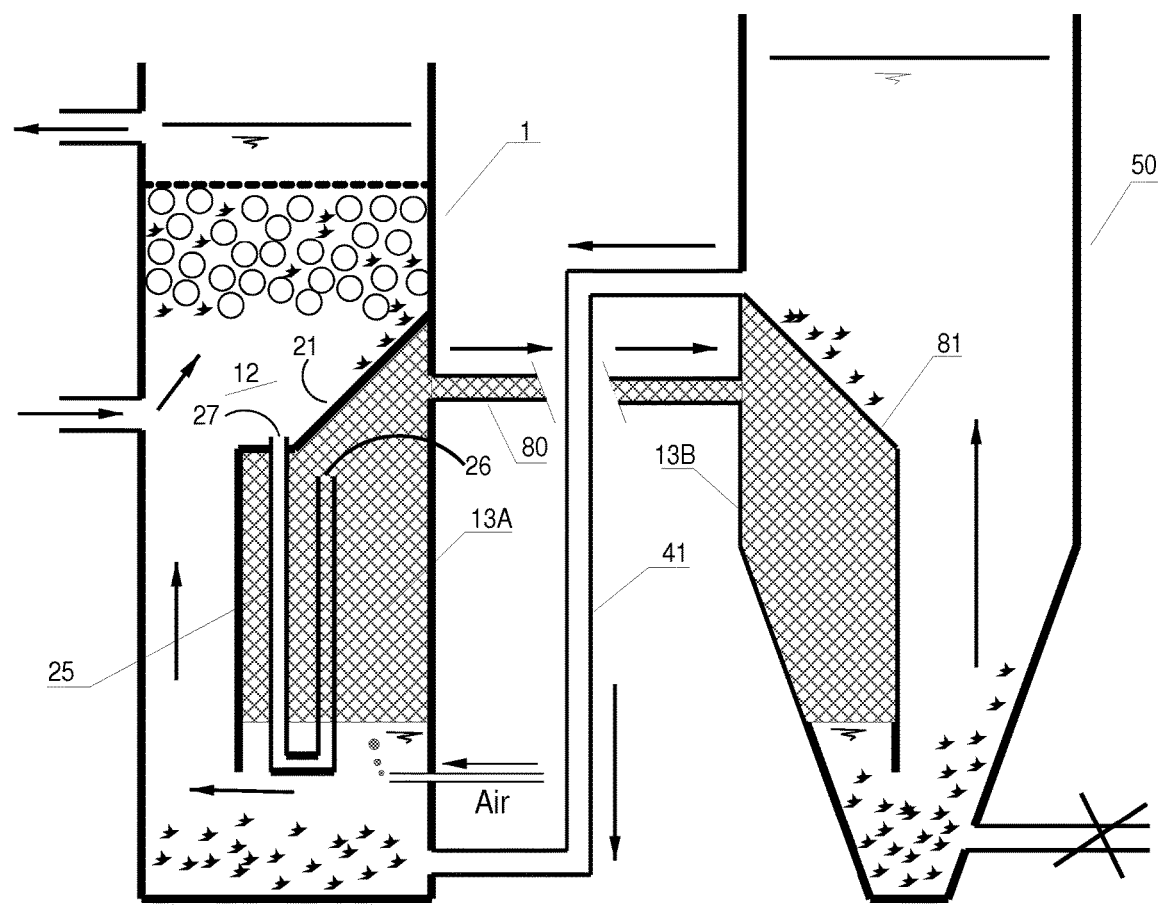
FIG. 5A illustrates a further embodiment of the present invention.
Figure 5B:
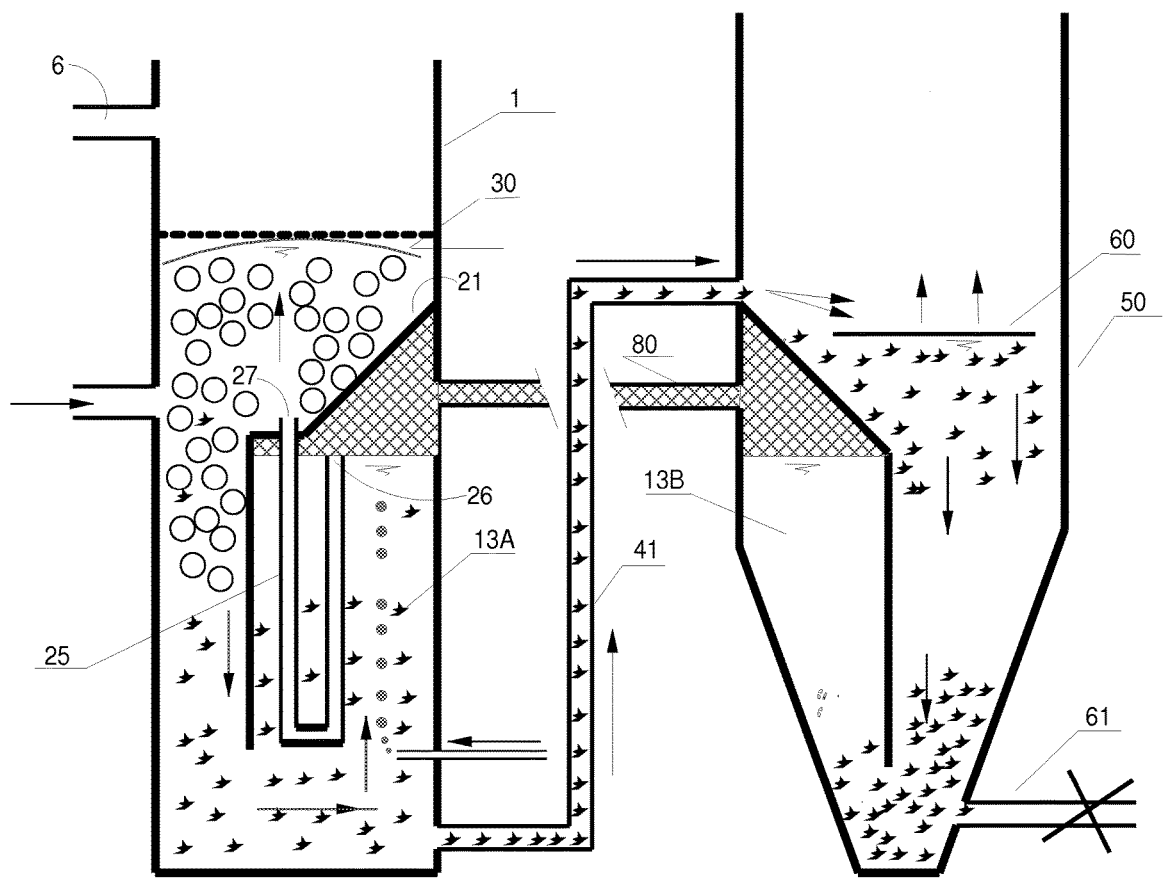
FIG. 5B illustrates the FIG. 5A embodiment during the backwash stage.

A further embodiment is seen in FIGS. 5A and 5B. In FIG. 5A, the charge chamber 13 has been divided into two sub-chambers, with sub-chamber 13A formed in media filter 1 and sub-chamber 13B formed in sludge basin 50 by internal wall 81. The air transfer tube 80 allows air to flow freely between the two sub-chambers. During the normal filtration stage, air filling sub-chamber 13A flows into sub-chamber 13B through air transfer tube 80. Water displaced out of sub-chamber 18B as it fills with air will tend to slowly raise water elevation 60 urging solids free water from sludge basin 30, through sludge line 41, and into media filter 1 at the base of sub-compartment 13A until the pressure equalizes with water in filter chamber 12.

During the filtration stage (FIG. 5A), as the charge subcompartments 13A and 13B slowly fill with air, water level 30 will remain fixed by fluid outlet 6 while sludge basin fluid level 60 will be forced upwards, inducing a primary flow of clear water through sludge line 41 into floating media filter 1. During the early stages of a backwash, while air discharges through siphon 25 from sub-chamber 13A, air simultaneously moves from sub-chamber 13B into sub-chamber 13A. The effective volumes of sub-chambers 13A and 13B are measured between the elevation of the inlet opening 26 and invert of air siphon 25. Water moves into the bottom of both sub-chamber 13B (and 13A) as air escapes. As the backwash progresses, media filter fluid level 30 can be expected to drop below sludge basin fluid level 60 causing a secondary flow of relatively clear (solids free) waters to flow from sludge basin 50, through sludge line 41, and into floating media filter 1. The net effect of the primary and secondary transfers of clear water out of the sludge basin 50 is lowering the volume of water held in sludge basin 50 for a few seconds as the trigger closes. In the late stages of backwashing (FIG. 5B), the process reverses as the media filter fluid level 30 rises above sludge basin fluid level 60. However, the reversed flow passing through sludge line 41 refills the sludge basin 50 with sediment laden water drawn from the bottom of the floating media filter 1. Sub chamber 13B is sized to effectuate at least a 25-50% of the total charge chamber volume (the effective volume of sub-compartment 13A plus the volume of sub-compartment 13B). Sub-compartment 13A need only be large enough to house the air siphon, thus compartment 13B can generally vary from about 25% to as high as 80% of the total charge chamber volume. In the illustrated embodiment, air transfer tube 80 is positioned above the inlet opening 26 of siphon 25, thereby insuring the water level does not reach transfer tube 80. This prevents any filter media which might reach sub-chamber 13A from being able to migrate to sludge basin 50. Surging of stored sludge into and out of sub-compartment 13B is considered desirable where sludge removal from sludge basin 50 is extended (days to weeks) as it prevents sludge from consolidating to the point that it will not flow out of sludge discharge line 61. The inclusion of a charge chamber subcompartment in the sludge basin 60 as seen in the embodiment illustrated in FIGS. 5A and 5B also has advantage of increasing the volume of sludge transferred in a single backwash event. This embodiment can be used to increase peak differential heads and transfer velocities across sludge line 41, both advantageous design features when dealing with potentially thick sludges. Further, this embodiment can be used to further shorten the height of the floating media filter 1, a further advantageous feature for gravity or airlifted filtration operations. FIGS. 5A and 5B also illustrate how in certain embodiments, the upper wall 21 of the charge chambers 13 is sloped downward from the outer wall of the media filter (or sludge basin) toward the interior of the media filter (or sludge basin). When siphon 25 discharges, this sloping wall structure tends to direct at least a portion of the filter media into a rolling motion as the beads move first along, and then past sloping upper wall 21. This rolling motion is often beneficial for removing biofloc forming in the media bed during the filtration stage.

Figure 5C:
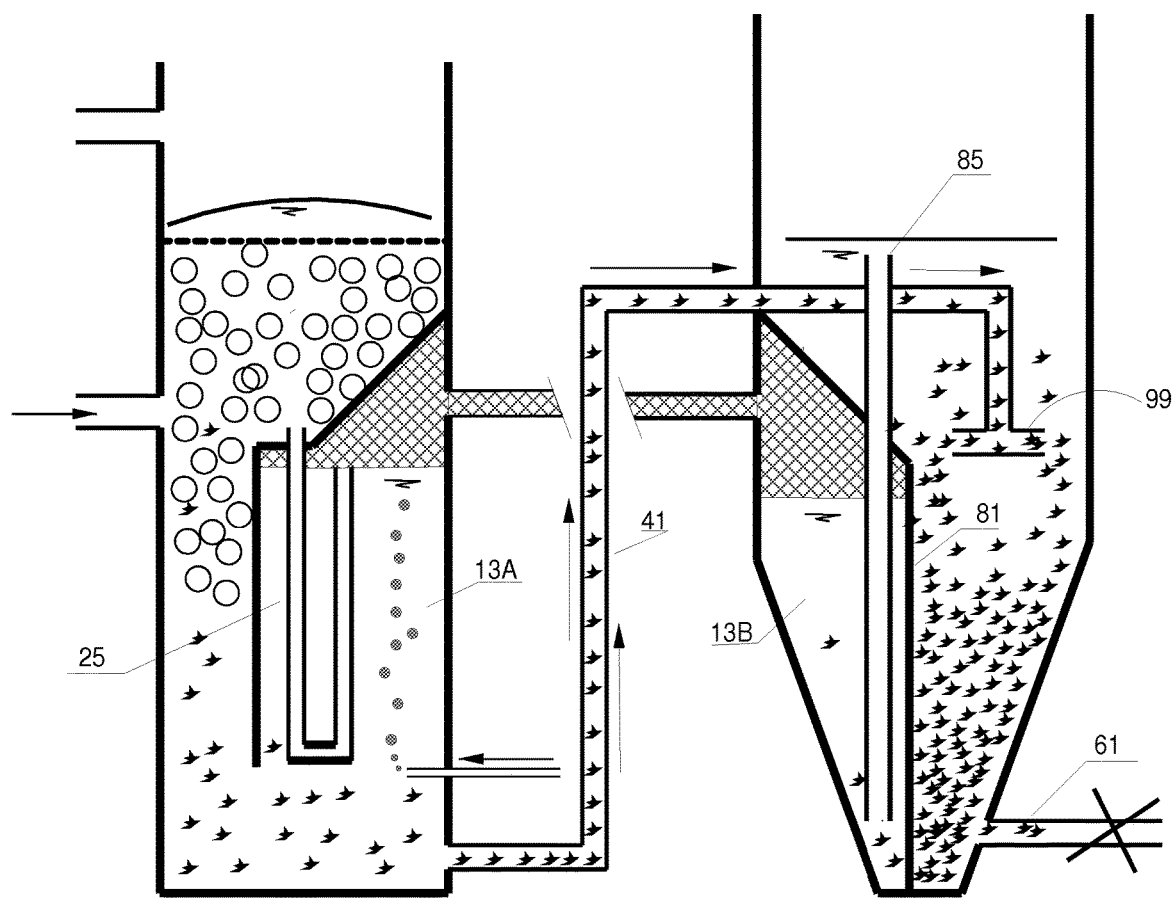
FIG. 5C illustrates another variation on the embodiment of FIG. 5A.

FIG. 5C illustrate a modification of the preceding embodiment wherein internal wall 81 in sludge basin 50 extends to the bottom of sludge basin 50 and isolates the lower (sludge accumulation) portion of basin 50 from sub-chamber 13B. A draft tube 85 extends from a point outside of sub-chamber 13B to the bottom portion of sub-chamber 13B. The lower opening of the draft tube 81 is below the invert of air siphon 25 (a distance of ½ inch is generally sufficient) to prevent short circuiting of the syphon trigger mechanism. The upper point of draft tube 85 is preferably sufficiently far below the normal sludge basin fluid level 60 that an adequate volume of water can drain into sub-chamber 13B to replace the air exiting sub-chamber 13B during the backwash stage. This arrangement allows the water level in sub-chamber 13B to rise and fall through the filtration and backwashing stages (via draft tube 85) without disturbing the accumulating sludge in the bottom of sludge basin 50. It will be readily apparent that not disturbing the sludge in this area of basin 50 will allow the sludge to more quickly reach a high concentration of solids (e.g. 6% to 10%) prior to being withdrawn via sludge discharge line 61 at removal intervals typically measured in hours to a few days. FIG. 5C also illustrates the terminal end of sludge line 41 being fitted with diffuser 99 to aid in preventing sludge line discharge from disturbing consolidating sludge at the bottom of sludge basin 50.

Figure 5D:
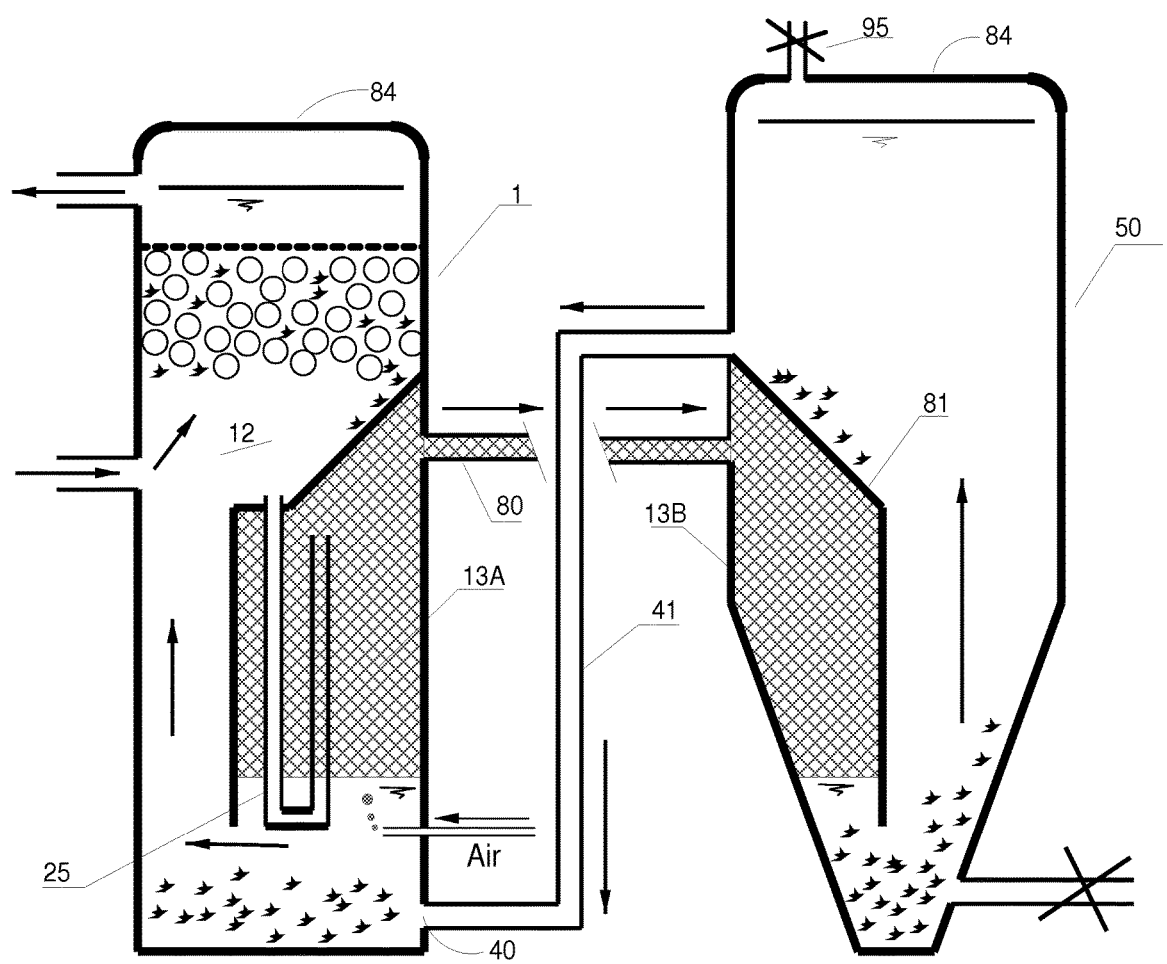
FIG. 5D illustrates a pressurized version of the embodiment of FIG. 5A.

FIG. 5D is similar to the embodiment of FIG. 5A, except pressure covers 84 have been added to media filter 1 and sludge basin 50. In this embodiment, only sludge basin 50 includes the air relief valve 95. It is observed that the operation of the charge chambers 13A and 13B is based solely upon internal differential pressures and is unaffected by the external hull pressures. Employment of the air relief valve 95 has the advantage of encouraging more water/sludge exchange during a backwashing event, but is not necessarily required for sludge transfer during a backwashing event. In many floating media filter 1 designs, the passage of air by the charge chambers effectively releases the pressure on floating media filter 1 until the media filter fluid level rises to flood the fluid outlet 6. If the air relief valve 95 is included on the pressure cover 84 of storage basin 50, then sludge transfer occurs with a primary and secondary water/sludge movement as described in connection with FIG. 5B. However, if the air relief valve 95 is excluded, sludge movement occurs only as charge chamber 13B discharges and fills with water via sludge line 41. Under these conditions, sludge movement occurs early in the backwashing event with little opportunity for resuspension of sludges held in the proximity of sludge outlet 40. Thus, inclusion of the air relief valve 95 on the pressure cover impacts both volume and potentially the solids density of water transferred.

Figure 5E:
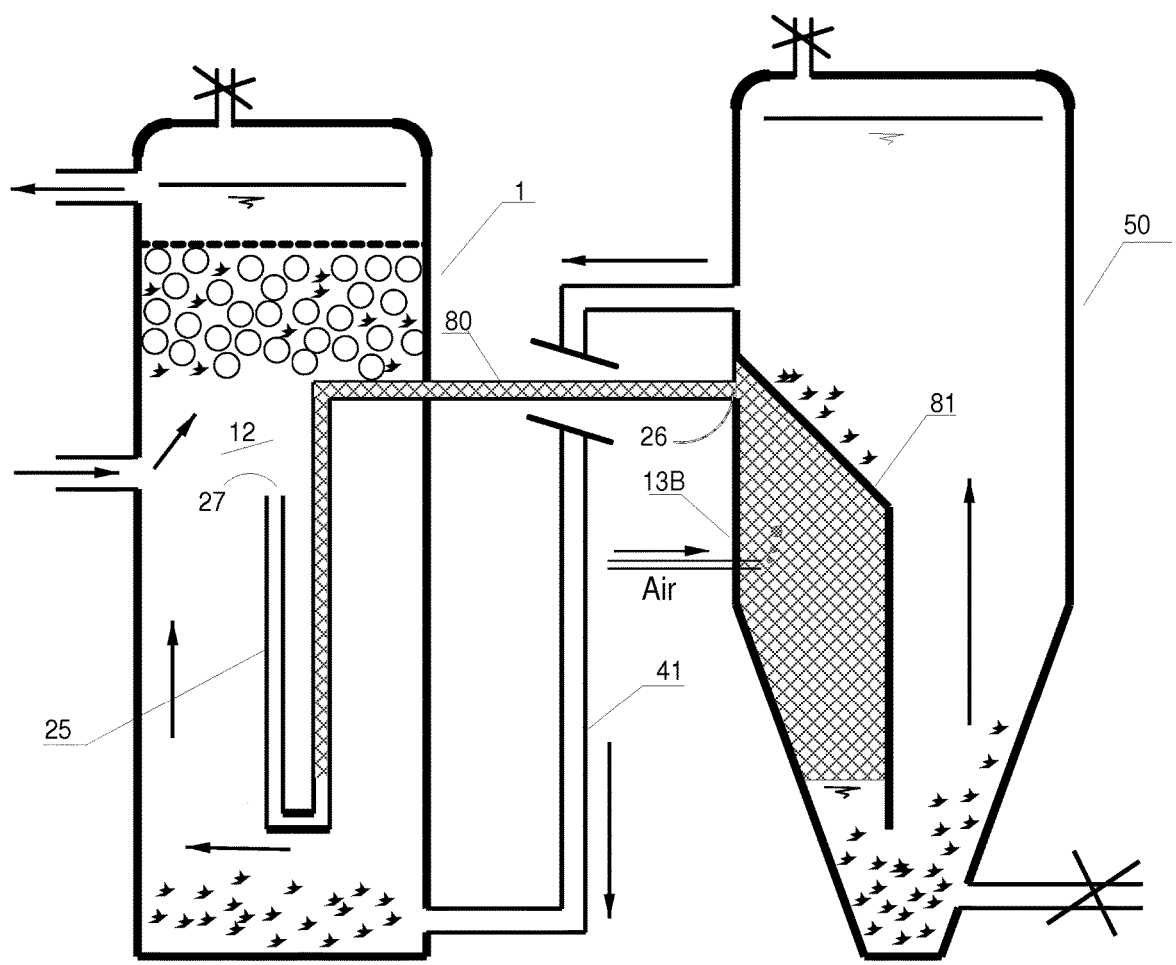
FIG. 5E illustrates a modification to the embodiment of FIG. 5A.
Figure 5F:
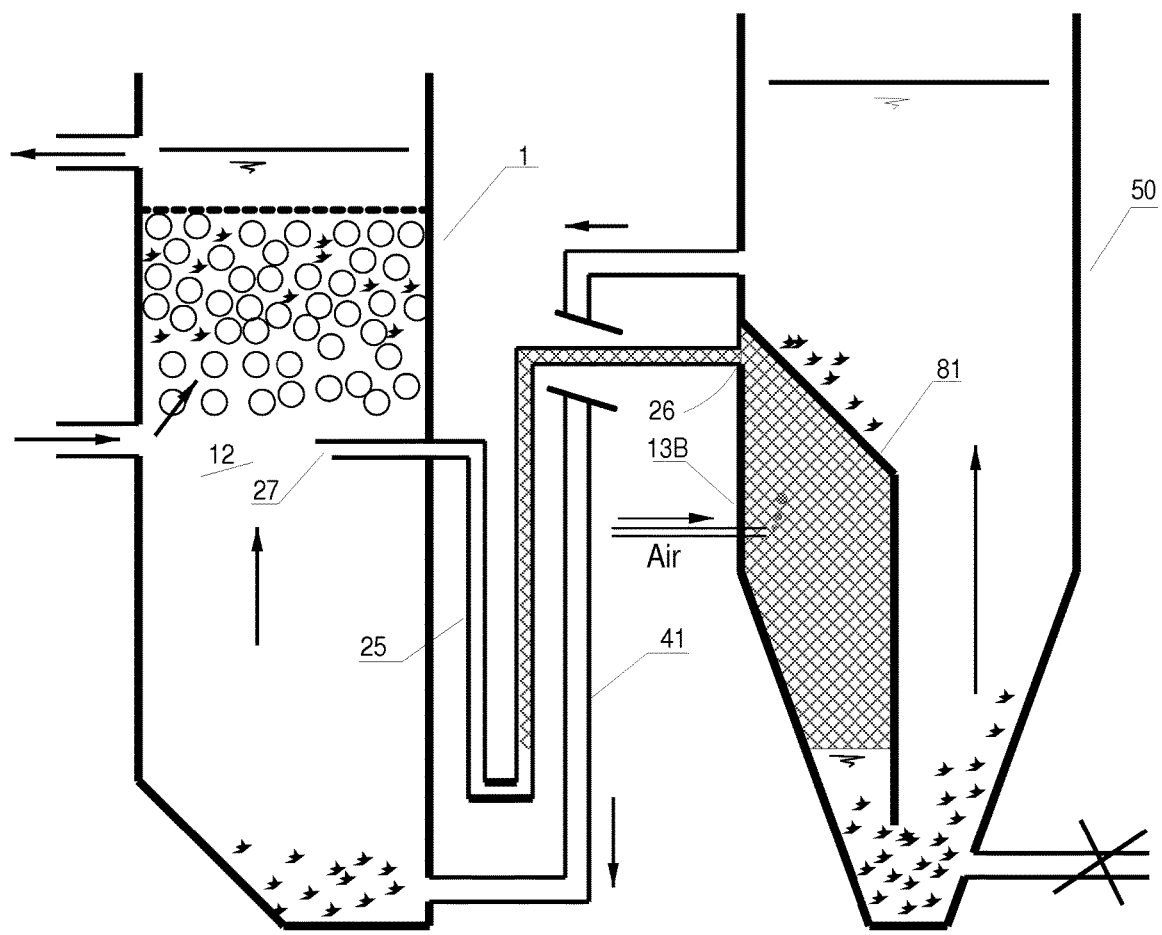
FIG. 5F illustrates the embodiment of FIG. 5E, but with an external syphon.

The embodiment of FIG. 5E differs from earlier embodiments in that the charge chamber 13 is formed solely in sludge basin 50 and air passage 80 transmits the air to the floating media filter 1. The FIG. 5F embodiment is an unpressurized modification of 5E showing the trigger (or siphon) 25 positioned outside the floating media filter 1. These embodiments (FIGS. 5E and 5F) maximize the potential for shortening the filter media filter 1, an important feature in many applications. Movement of the trigger invert 29 to a position external to the floating media tank facilitates serving the trigger should clogging occur. FIGS. 5E and 5F also illustrate the positioning of siphon discharge opening 27 at a lower elevation (typically 2-4") below the syphon inlet opening 26. Additionally the air pocket defined by charge chamber 13B is above the siphon discharge opening (perhaps 4-6"). With this configuration, it is more certain that trigger flooding occurs via the siphon discharge opening 27 and not the siphon inlet opening 26. Flooding of the trigger from the discharge end terminates when the water level in the vertical section of air equalization passage 80 rises to the air level in 13B; no sludge or beads enter the horizontal portion of 80, thus avoiding potential clogging issues. Exact positioning of the siphon openings and the height of the charge chamber 13B is impacted by the scale and hydrodynamics of the embodiment, so the relative distances can vary widely. Although all embodiments illustrated can operate with the siphon discharge 27 above the siphon inlet 26, lowering of the siphon discharge 27 below siphon inlet 26 is preferred whenever the horizontal portion of air equalization passage 80 is long or convoluted.

Figure 5G:
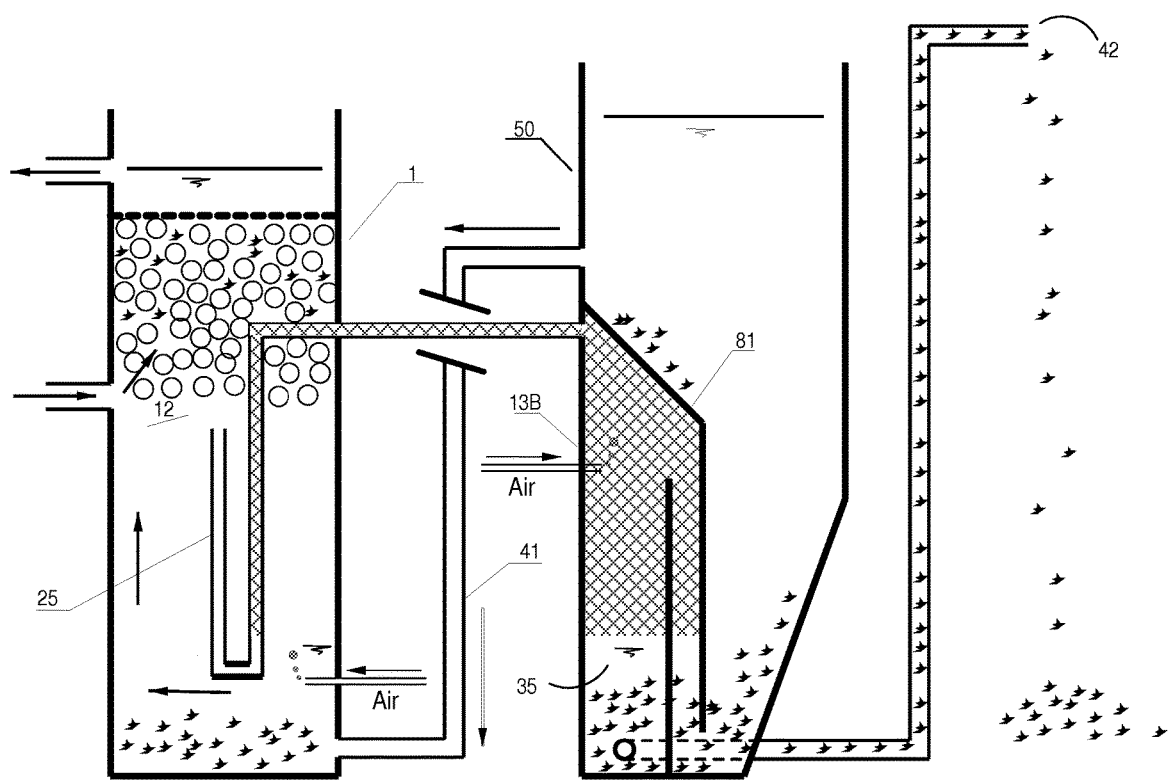
FIG. 5G illustrates the embodiment of FIG. 5E, but further including a sludge accumulation compartment.

FIG. 5G illustrates the charge chamber 13 in the sludge basin and a sludge accumulation compartment 35 within the charge chamber. This configuration utilizes the features of FIG. 5A to achieve movement of sludge from floating media filter 1 to the external sludge basin 50, but then operates similar to FIG. 2A in that sludge is discharged externally through a raised sludge discharge port 42 via pressure in the sludge accumulation compartment generated as the charge chamber 13B is filled during the normal filtration stage. The movement of sludge by the FIG. 5A exchange mechanism followed by a controlled settling in a more elevated sludge basin 50, is more effective at sludge concentration than direct discharge with the FIG. 2A mechanism. This integration of the features of 2A and 5A is advantageous particularly in commercial aquaculture operations where numerous replicated units are subject to heavy solids loading. The pneumatic removal of sludges from the sludge basin 50 is more reliable and cost effective than the manual or process control options currently available.

Figure 5H:
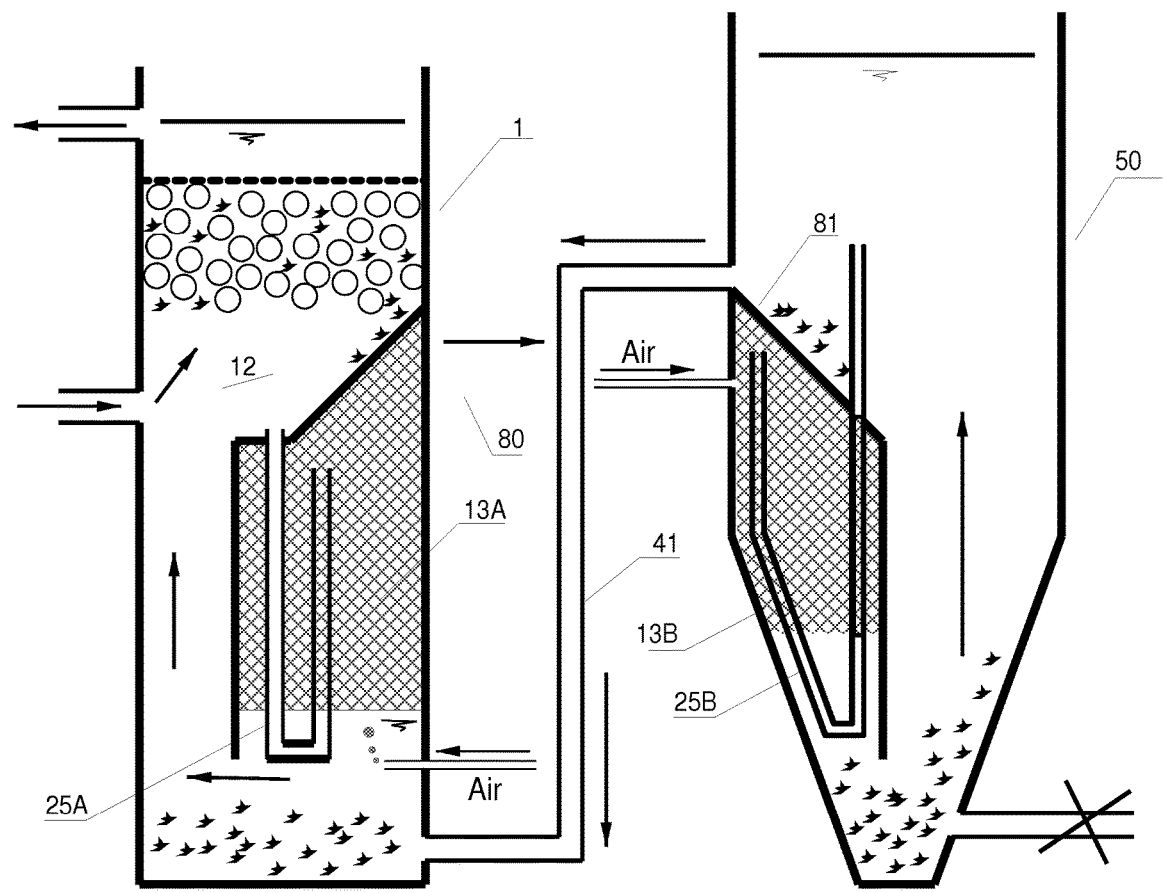
FIG. 5H illustrates an embodiment having a siphon trigger in both the media filter and the sludge basin.
Figure 5I:
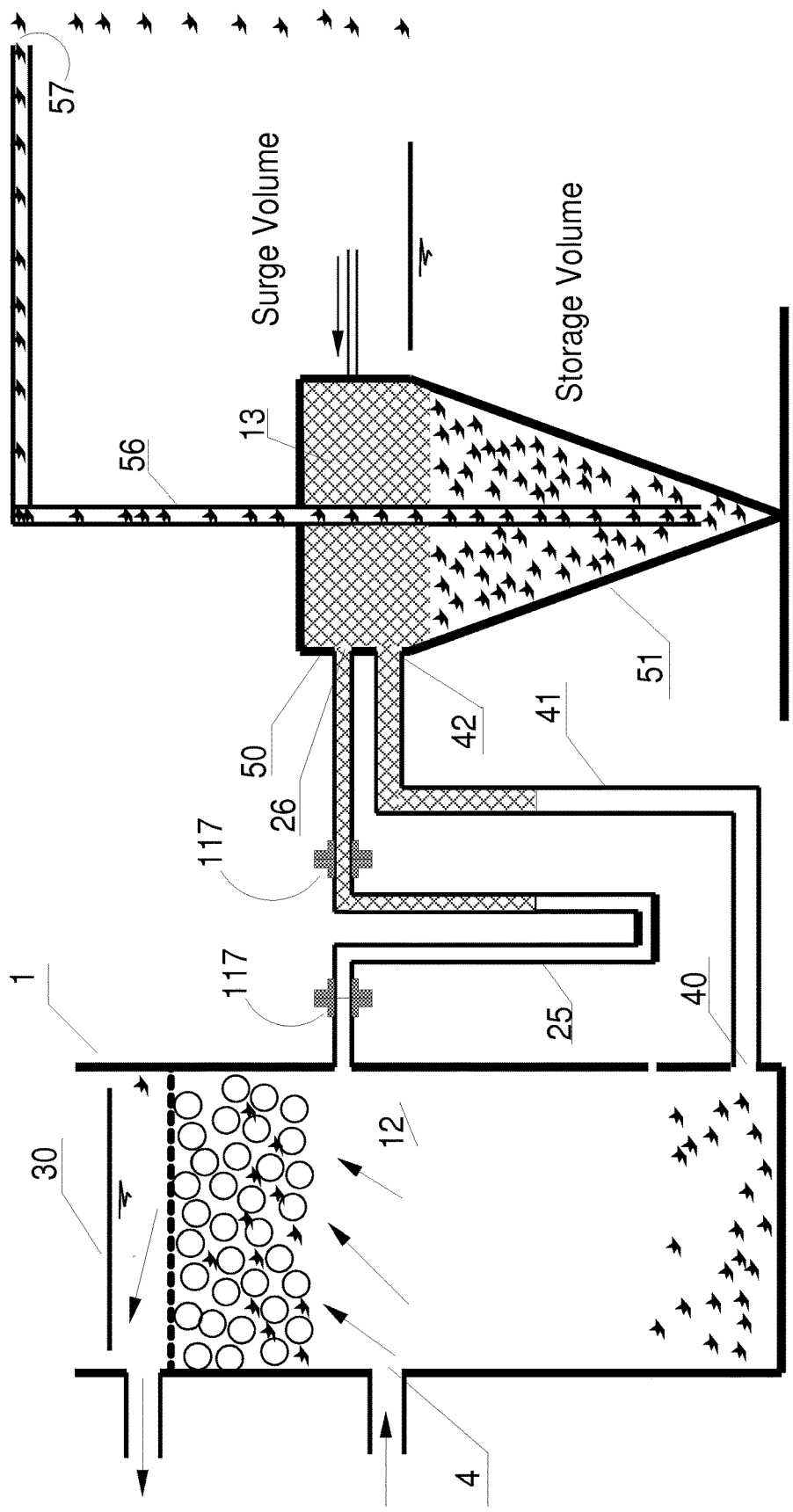
FIG. 5I illustrates an embodiment with an external charge chamber and siphon trigger.

FIG. 5H illustrates a further modification where the media filter 1 and the sludge basin 50 each have a trigger in their respective charge chambers (i.e., siphons 25A and 25B). In a preferred example, siphons 25A and 25B can be set to trigger at different intervals (e.g., by different feed rates of air into charge chambers 13A and 13B). This would be desirable for example, when it is advantageous to allow sludge in the bottom of media filter 1 to build up for multiple backwash cycles and then move the sludge to sludge basin 50 by triggering siphon 25B. FIG. 5I illustrates a variation where sludge basin 50 is enclosed and trigger 25 is external to both medial filter 1 and sludge basin 50. In this embodiment, the charge chamber 13 is effectively formed in the upper portion of sludge basin 50 while the lower portion of the sludge basin forms a conical section 51. A sludge line 41 extends between the media filter sludge outlet 40 and the discharge port 42 of sludge basin 50. The movement of sludge from media filter 1 to sludge basin 50 takes place as charge chamber 13 discharges. However, a sludge discharge line 56 further extends from the lower conical section 51 of sludge basin 50 and is positioned with an elevated discharge port 57 for removing concentrated sludge from basin 50. The height of discharge port 57 will be governed by the relationships discussed in reference to FIGS. 2A to 2C. For example, the height of discharge port 57 in certain embodiments will be somewhat above the siphon trigger head of media filter 1. FIG. 5I further illustrates how siphon trigger 25 is constructed with unions 117. Unions 117 are substantially air-tight joints which may be constructed in any conventional manner. Unions 117 allow easy access to siphon trigger 25 should if ever be necessary to clean or otherwise obtain access to the interior of the siphon. In the case of aquacultural applications where continuous filter operations are critical to the survival of the fish, it is also common practice to equip charge chambers with two triggers to assure operation continues should one clog.

Figure 6:
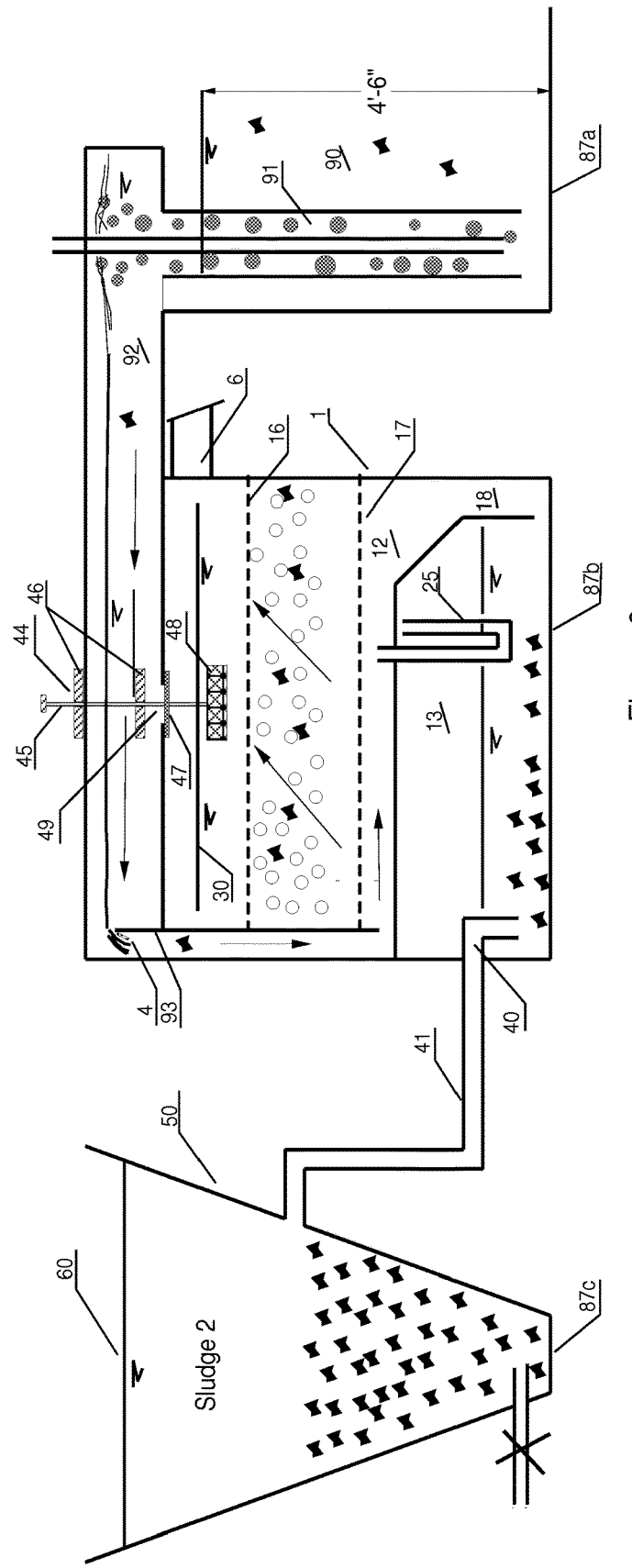
FIG. 6 illustrates a further embodiment of the present invention.

A further embodiment is seen in FIG. 6. However, FIG. 6 also illustrates an influent tank 90 with an airlift pump 91 raising influent into an influent trough 92 positioned over media filter 1. Media filter 1 has a somewhat different configuration than seen in the previous figures. This media filter 1 is structured to generally have a lower elevation profile with a more laterally elongated filter chamber 12 and charge chamber 13. The floating media is contained between upper screen 16 and lower screen 17 eliminating concerns about media movement into the elongated charge chamber 13. Fluid from influent trough 92 passes over influent weir 93 at the filter influent inlet 4. The influent flows though the filter media and exits at fluid outlet 6. A float activated seal 44 is positioned in the influent trough above the filter chamber 12. Float activated seal 44 includes a rod 45 which is allowed to move vertically (and is constrained to such vertical movement) by rod guides 46. A float 48 and seal plate 47 are also positioned on rod 45 in a manner which causes float 48 to press seal plate against trough opening 49 and effectively close off trough opening 49 when the fluid level 30 is at its highest point during the normal filtration stage.

Similar to the embodiment of FIGS. 4D and 4E during the backwash stage, the lowering of water in filter chamber 12 allows float 48 and seal 47 to move downward, thereby unsealing trough opening 49 and allowing influent from trough 92 to flow onto the media filter below, again increasing the agitation and scouring action on the floating media elements. As previously described, water from both filter chamber 12 and sludge basin 50 will enter charge chamber 13 during the backwash cycle. After the water level in charge chamber 13 has reached its maximum height and filter chamber 12 begins refilling, a portion of the sludge laden water in charge chamber 13 will move to sludge basin 50 until the head pressure from basin level 60 is equal to the pressure sludge outlet 40, which here is controlled by the water level at inlet 4. This embodiment is typical of airlifted recirculating aquaculture systems where elevations are extremely limited by the lift constraints associated with cost effective airlift implementation. Here, the seal 47 is controlled by the predictable movement of water level 30 upon the air discharge of through air siphon 25 in contrast to the embodiment illustrated in FIGS. 4D and 4E where the flapper valve is dependent on the water elevation in the water delivery trough. The water trough elevation is subject to higher design variability due its sensitivity to water flow and variable bead bed headloss. Here water level 30 is well above the screen 16 providing rapid counter flow through the bead bed during a backwash event so the relative contribution from sludge storage basin 50 is controlled by the hydraulic design of sludge line 41 and the openings (typically series of circular orifices) that connect the minimized settling area 18 with the charge chamber 13.

In certain embodiments, the bottom inside surface 87 of each of influent tank 90 (bottom surface 87a), media filter 1 (bottom inside surface 87b), and sludge basin 30 (bottom inside surface 87c), will all be at approximately the same elevation (e.g., all bottoms 87 are within less than 12 inches, or alternately, less than 6 inches of one another). The bottom of the tanks being at approximately the same elevation is a useful characteristic when the system is being placed on an existing grade (e.g., the concrete floor of an existing structure).

Figure 7:
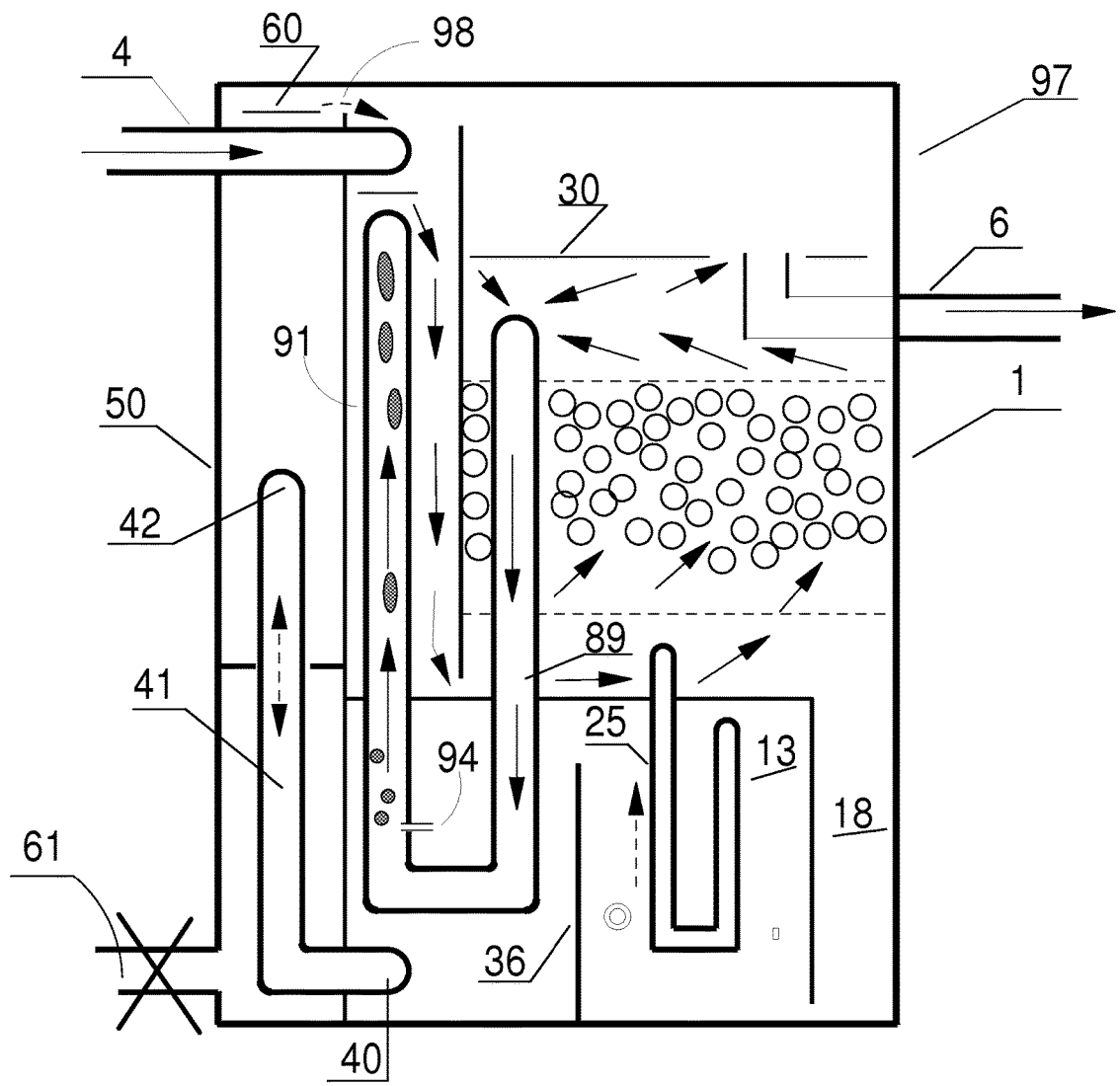
FIG. 7 illustrates an embodiment with effluent recirculation.

FIG. 7 illustrates a still further embodiment. FIG. 7 suggests how media filter 1 and sludge basin 50 may be constructed of flat panel sections 97 in a rectangular configuration. The rectangular configuration may provide significant space-savings depending on the layout of the building or other structure in which the system is to be housed. In one embodiment, panel sections 97 may be a corrosion resistant material such as marine-grade aluminum or stainless steel. It is further seen in FIG. 7 that one wall of media filter 1 also forms a wall of sludge basin 50. This "common wall" between the media filter and sludge basin may be a single wall or two walls positioned against one another. The lower section of the sludge basin has two inwardly sloping panels which form the sloped surface for concentrating sludge. A sludge discharge line 61 will remove concentrated sludge. FIG. 7 also shows an overflow weir 98 on the wall between the media filter and sludge basin, allowing overflow from sludge basin 50 into media filter 1.

FIG. 7 demonstrates the use of piping external to the media filter and sludge basin to form many of the fluid passages described in earlier embodiments. These passages direct fluid to the internal spaces of the media filter and sludge basin. Thus, it can be seen that the siphon 25 is external to the media filter. Likewise, sludge line 41 is external to the media filter and sludge basin. Moreover, this embodiment includes a recirculation line 89 which directs filtered fluid from above the filter chamber back to a point near the influent inlet such that the filtered fluid may be mixed with unfiltered influent. FIG. 7 suggests how a portion 91 of this recirculation line will form an airlift by the introduction of air through air injection port 94. The operational aspects of this embodiment are similar to those described in reference to FIG. 3A (with of course, the addition of the recirculation line).

Those skilled in the art will recognize a general design principle running through many of the illustrated embodiments despite the wide variation in structure. For example, the embodiment of FIG. 2A can be viewed as the same concept as the embodiment of FIG. 5I. Both of these embodiments include a floating media filter, a charge chamber, a trigger, and some type of sludge storage volume (i.e., whether the "sludge accumulation compartment" in FIG. 2A, the separate sludge basin 50 in FIG. 5I, or another sludge storage volume not illustrated). Likewise, a common characteristic of the sludge volume in FIGS. 2A and 5I is that both have at least one wall extending upward to form an upper opening. This wall has a height substantially above the trigger release point and substantially isolates the sludge volume from the charge chamber except for the upper opening. These sludge volumes have an inlet at a height which allows pressure within the media filter during a filtration stage to move water above the wall height and into the sludge volume. Thus, the wall 36 in FIG. 2A is functionally the same as the conical wall of sludge basin 50 (and the outer wall of media filter 1) in FIG. 5I. The inlet to the sludge volume (sludge accumulation compartment) in FIG. 2A is over the top of the wall 36, while the corresponding inlet in FIG. 5I is discharge port 42 into sludge basin 50. In both FIGS. 2A and 5I, the sludge volume has an upper opening which is exposed to pressurized air from the charge chamber. These characteristics can generally be seen across all the illustrated embodiments. However, it is stressed that the present invention is not limited to embodiments having the above illustrated characteristics and other inventive embodiments not illustrated need not have these characteristics. Additionally, while many embodiments described herein deal with floating filter media (i.e., the media elements of "beads" have a specific gravity of less than 1.0), other embodiments could employ filter media with a specific gravity greater than 1.0.

Thus, while many parts of the present invention have been described in terms of specific embodiments, it is anticipated that still further alterations and modifications thereof will no doubt become apparent to those skilled in the art. Nothing in the specification should be considered a size limitation on how large or small the treatment system may be. Nor should the specific embodiments be interpreted as a limitation on the geometric configuration of the system components. The present invention could take on any number of widely differing geometric configurations as illustrated by the differences between the various illustrated embodiments. It is therefore intended that the following claims be interpreted as covering all such alterations and modifications as fall within the true spirit and scope of the invention.

The invention claimed is:

1. A water treatment system comprising:
   (a) a floating media filter comprising:
      (i) a filter chamber having a volume to accommodate filter media;
      (ii) a charge chamber for storing air, the charge chamber being fluidly connected to the filter chamber and including: (1) an air outlet for admitting air into the filter chamber; (2) an air inlet; and (3) a trigger for selectively allowing the passage of air through the air outlet;
      (iii) a sludge outlet proximate a bottom of the floating media filter; and (b) a sludge concentration/storage basin comprising:
  (i) at least one wall separating the sludge storage basin from the floating media filter chamber;
  (ii) a sludge inlet communicating with the sludge outlet of the floating media filter through a sludge line, the sludge inlet being above the sludge outlet; and
(c) wherein a backwash cycle of the media filter drives an exchange of fluid between the media filter and the sludge concentration/storage basin without either
  (i) a pump interfacing with the sludge line, or
  (ii) a valve interfacing with the sludge line periodically opening and closing.

2. The water treatment system according to claim 1, wherein the (i) lowering of fluid in the media filter during a backwash cycle provides a driving force to move fluid from the concentration/storage basin to the media filter; and (ii) raising fluid in the media filter provides a driving force to move fluid from the media filter to the concentration/storage basin.

3. The water treatment system according to claim 1, wherein the sludge basin includes an air chamber in communication with the charge chamber of the floating media filter.

4. The water treatment system according to claim 1, further comprising an influent tank supplying influent to the floating media filter, wherein a bottom of each of the influent tank, the floating media filter, and the sludge basin are all at approximately the same level.

5. The water treatment system according to claim 4, further comprising at least one air lift pump moving influent from the influent tank to the floating media filter.

6. A method of constructing a water treatment system comprising the steps of:
  a. providing a floating media filter comprising (i) a filter chamber having a volume to accommodate filter media, and (ii) a sludge outlet;
  b. providing a sludge concentration/storage basin comprising (i) at least one wall separating the sludge basin from the floating media filter chamber; and (ii) a sludge inlet;
  c. connecting the sludge outlet of the floating media filter to the sludge inlet of the storage basin via a sludge line such that fluid is moved through the sludge line by a backwash cycle of the media filter without a pump or closeable valve interfacing with the sludge line;
  d. providing a charge chamber for storing air, the charge chamber including: (i) an air outlet for admitting air into the filter chamber; and (ii) an air inlet;
  e. fluidly connecting the charge chamber to the filter chamber; and
  f. providing a trigger for selectively allowing the passage of air through the air outlet of the charge chamber.

7. A water treatment system comprising a tank comprising:
  a. a filter chamber having a volume to accommodate a floating filtration media;
  b. a tank inlet, adapted to let influent water enter the tank in the filter chamber from an influent feed height;
  c. a charge chamber defined by charge chamber walls positioned in a lower section of the tank, the charge chamber forming a substantially airtight enclosure along the length of the walls, the charge chamber being equipped with an air inlet in order to allow the introduction of air into the charge chamber, and an air outlet for admitting air into the filter chamber, wherein a variable air pocket can be formed in the interior space of the charge chamber above the water level in the charge chamber;
  d. a settling area formed between a wall of the tank and a wall of the charge chamber, which terminates in the approximate vicinity of the bottom of the tank, so that there is an inlet passage between the bottom and the wall, allowing the transfer of water from the filter chamber to the charge chamber;
  e. a trigger, which is a siphon communicating with the charge chamber, wherein a first section of the siphon, which is a discharge opening, extends through the air outlet of the charge chamber to communicate with the filter chamber, a second section of the siphon has an inlet opening communicating with the variable air pocket of the charge chamber, and the lowermost section of the siphon has an invert, the height of the inlet opening defining a trigger closure point and the height of the invert defining a trigger release point;
  f. wherein the water treatment system is adapted to function successively in a filtration mode and in a backwashing mode, wherein during filtration mode, air is slowly entering through the air inlet and accumulating in the variable air pocket, lowering the water level in the charge chamber and in the siphon until the water level reaches the trigger release point and a backwashing mode is triggered and air begins to rapidly escape from the charge chamber through the siphon and into the filter chamber, so as to provoke vigorous agitation of the floating filtration media, thereby allowing excess bio-floc and trapped sediments to be removed from the floating filtration media, and so as to provoke as well a flow of water from the filter chamber into the charge chamber through the inlet passage, until the rising water level in the charged chamber reaches the trigger closure point and the air siphon inlet is flooded, which ends the backwashing mode and allows the return to a normal filtration mode;
  g. wherein: (i) a sludge accumulation compartment is positioned within the charge chamber which is formed by a sidewall extending upward from the bottom of the sludge accumulation compartment, wherein an opening is formed at the top of the sidewall, such that:
    (1) water entering the charge chamber during a backwash cycle flows into the sludge accumulation compartment when the water level over-tops the sidewall;
    (2) the interior of the sludge accumulation compartment is subject to the pressurized air present within the charge chamber;
    (3) the sidewall has a height above the trigger release point and below the trigger closure point; and
  (ii) a sludge outlet is formed approximate the bottom of the sludge accumulation compartment, and
  (h) the water treatment system further comprises a sludge line communicating with the sludge outlet and extending upward to terminate in a sludge discharge port, wherein the sludge outlet is positioned to prevent air escape through the sludge line, and wherein the discharge port is at a height above the influent feed height; so that during and immediately after the backwashing mode the head moving sludge through the discharge port is removed, and in the early stage of the filtration mode the suspended sludge has the opportunity to settle and concentrate before the charge chamber builds sufficient air pressure to begin pushing the sludge out through the discharge port in the late stage of the filtration mode.

8. The water treatment system of claim 7, wherein the sidewall of sludge compartment is inclined to improve sludge concentration or removal.

9. The water treatment system of claim 7, wherein the sludge discharge port is between about 0.06 m and 1.5 m (0.2 ft and 5 ft) higher than the trigger release point.

10. The water treatment system of claim 7, wherein the charge chamber has a height above a bottom of the floating media filter and the height of the sludge accumulation compartment upper opening is at least 50% of the charge chamber height.

11. The water treatment system of claim 7, wherein the volume of the sludge accumulation compartment is less than about ⅓ the volume of the charge chamber.

12. The water treatment system of claim 7, wherein the filter chamber includes filter media having a bed porosity volume and a volume of the sludge accumulation compartment is less than approximately the bed porosity volume.

13. The water treatment system of claim 7, wherein the height of the opening is at least half the distance between a siphon invert and a siphon inlet opening.

14. The water treatment system of claim 7, wherein the trigger is external to the tank.

15. The water treatment system of claim 7, wherein the sludge discharge port discharges into a sludge basin separate from the tank and the sludge basin has an equalization passage communicating with the tank.

16. The water treatment system of claim 7, further comprising a sludge basin including: (i) at least one wall separating the sludge basin from the filter chamber; and (ii) the sludge discharge port discharging into the sludge basin at a point approximate to or above the trigger closure point.

* * * * *